April 25, 1961 B. E. LUBOSHEZ Re. 24,972

PRISM-LENS OPTICAL SYSTEMS OF VARIABLE FOCAL LENGTH AND INCLUDING TWO ANAMORPHOTIC PRISMATIC SYSTEMS

Original Filed Aug. 30, 1954 11 Sheets-Sheet 1

Benjamin E. Luboshez
INVENTOR.

BY Daniel I. Mayne
Harold F. Bennett
ATTORNEY & AGENT

Benjamin E. Luboshez
INVENTOR.
BY Daniel I. Mayer
Harold F. Bennett
ATTORNEY & AGENT Benjamin E. Luboshez
INVENTOR.
BY Daniel I. Mayne,
Harold F. Bennett
ATTORNEY & AGENT Benjamin E. Luboshez
INVENTOR.
BY Daniel I. Wayne,
Harold F. Bennett
ATTORNEY & AGENT Benjamin E. Luboshez
INVENTOR.
BY Daniel I. Mayne
Harold F. Bennett
ATTORNEY & AGENT Benjamin E. Luboshez
INVENTOR.
BY Daniel T. Wagner
Harold F. Barnett
ATTORNEY & AGENT Benjamin E. Luboshez
INVENTOR.
Daniel J. Morgan
BY
Harold F. Bennett
ATTORNEY & AGENT April 25, 1961 B. E. LUBOSHEZ Re. 24,972

PRISM-LENS OPTICAL SYSTEMS OF VARIABLE FOCAL LENGTH AND INCLUDING TWO ANAMORPHOTIC PRISMATIC SYSTEMS

Original Filed Aug. 30, 1954 11 Sheets-Sheet 8

Benjamin E. Luboshez
INVENTOR.

BY Daniel J. Mayne
Harold F. Bennett
ATTORNEY & AGENT

Benjamin E. Luboshez
INVENTOR.
Daniel J. Mayne
BY
Harold F. Bennett
ATTORNEY & AGENT Benjamin E. Luboshez
INVENTOR.
BY Daniel S. Mayne
Harold F. Bennett
ATTORNEY & AGENT Benjamin E. Luboshez
INVENTOR.
BY Daniel L. Mayne,
Harold F. Bennett
ATTORNEY & AGENT United States Patent Office Re. 24,972
Reissued Apr. 25, 1961

24,972

PRISM-LENS OPTICAL SYSTEMS OF VARIABLE FOCAL LENGTH AND INCLUDING TWO ANAMORPHOTIC PRISMATIC SYSTEMS

Benjamin E. Luboshez, Rochester, N.Y., assignor to Eastman Kodak Company, Rochester, N.Y., a corporation of New Jersey Original No. 2,828,670, dated Apr. 1, 1958, Ser. No. 453,092, Aug. 30, 1954. Application for reissue July 3, 1958, Ser. No. 746,567

12 Claims. (Cl. 88—57)

Matter enclosed in heavy brackets [ ] appears in the original patent but forms no part of this reissue specification; matter printed in italics indicates the additions made by reissue.

This invention relates to magnification systems comprising refracting prisms and lenses and more particularly to magnifying and zoom attachments for photographic and telescopic objective lenses.

Reference is made to the following related copending applications: Serial No. 498,167, Prism Zoom System Having Deviation Correcting Means, filed March 31, 1955; Serial No. 498,168, Prism Magnification System Having Correction Means for Unilateral Color, filed March 31, 1955; Serial No. 531,884, Prism Magnification Systems Comprising Three or More Prisms, filed September 1, 1955; and Serial No. 531,991, Composite Prisms and Prismatic Magnification Systems Comprising Same, filed September 1, 1955. The first two of these are now Patents No. 2,780,140 and No. 2,780,141, issued February 5, 1957.

The anamorphosis of optical images by systems of refracting prisms individually set at non-minimum deviation in diametrically opposite orientation is well known. It is not so widely known that about 1810 Brewster and Amici independently suggested that two such anamorphosers crossed at 90° form a telescope system magnifying substantially uniformly in all directions. This idea remained just a theoretical curiosity, however, and without practical application until the present invention. Actually the Brewster and Amici systems were not sufficiently corrected to be useful even as low power telescopes. We now know how to make corrections so that a magnification of 2× could be obtained with such systems and these corrections will be discussed herein, but by themselves these features still fall short of anything really practical and useful. The gist of the present invention is that utility is not realized for the four prism system until it is combined with one or more lenses. The present invention always includes at least four prisms, two crossed with respect to the other two, and at least one lens. Many embodiments involving additional optical elements will also be described.

According to a preferred embodiment of the present invention, a prism system comprising two prism anamorphosers crossed at 90% is attached in front of an objective lens adapted to focus on a distant object and means are provided for changing the prisms from a position producing a magnification M greater than unity to a position producing a magnification substantially equal to 1/M.

In one form of this embodiment the prisms are mounted in a fixed position within a tube and means are provided for attaching either end of the tube to the front of the objective. In another form of the invention the prisms are mounted for individual rotation about axes parallel to their refracting edges and means are provided to coordinate the rotation of the several prisms so as to maintain the direction of the axis or the color correction or some compromise between the two as will be hereinafter described in more detail.

Preferably, for objects at a finite distance, an auxiliary lens is mounted in front of the prism system for rendering rays from an object point parallel.

The invention will be described with reference to camera or projection systems since it finds its greatest application there. However, exactly the same principle applies in the case of telescopes or afocal systems or any system including at least one positive lens.

Figure 16:
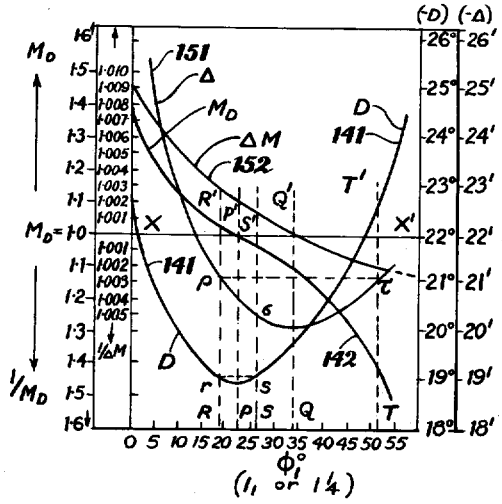
Fig. 16 is a combination of Figs. 14 and 15 showing how the graphs are used in design.
Figure 17:
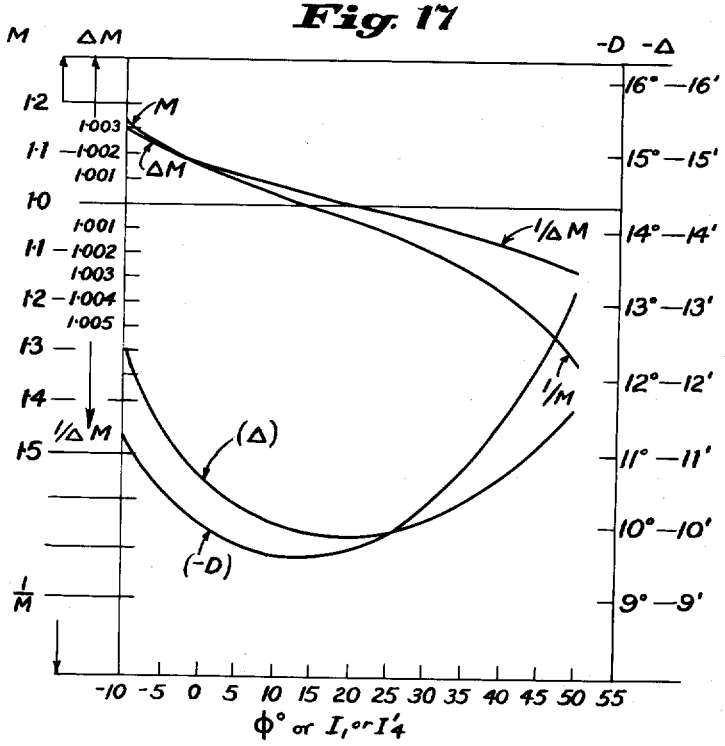

Fig. 17 corresponds to Fig. 16 but pertains to a prism of different glass and apex angle.

Figure 18:
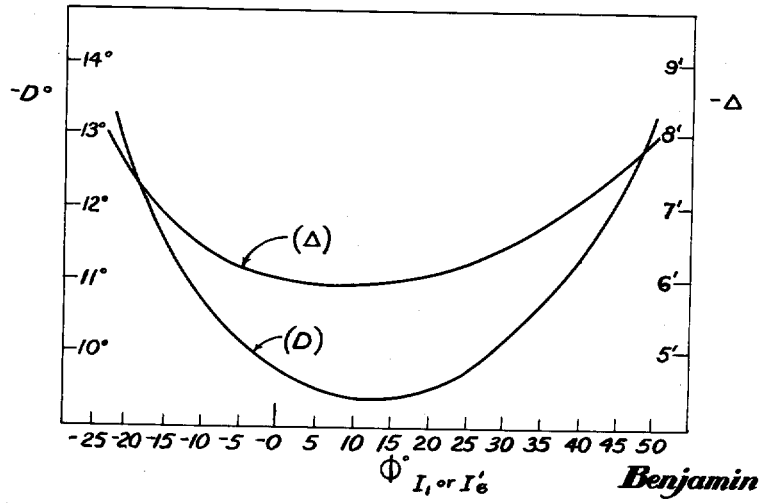

Fig. 18 is a graph showing two of the curves for a partly achromatized compound prism.

Figure 19:
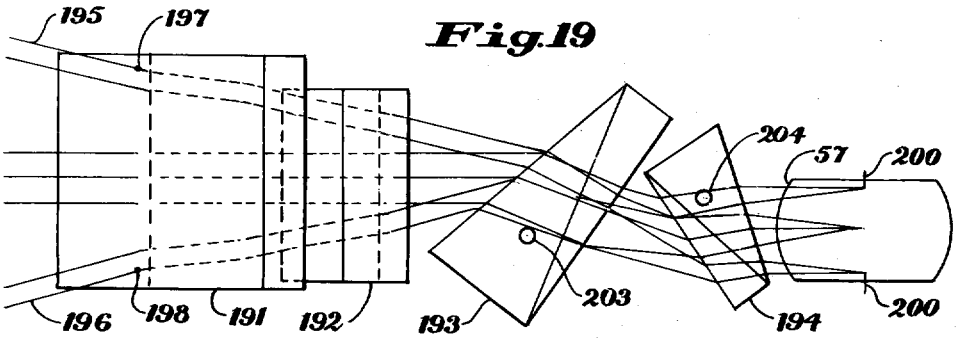
Figure 20:
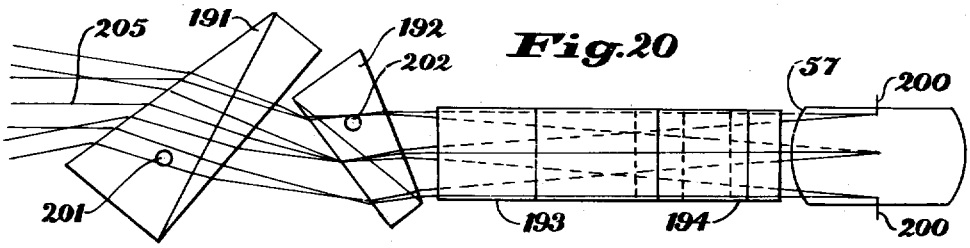

Figs. 19 and 20 are plan view and elevation of the optical parts of a zoom system according to a preferred form of the invention.

Figure 21:
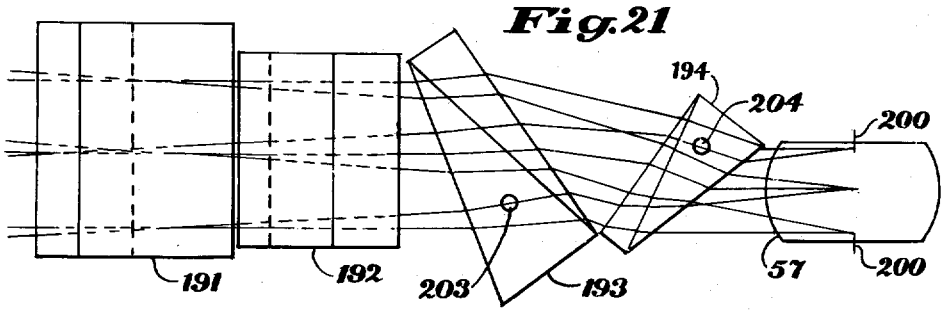
Figure 22:
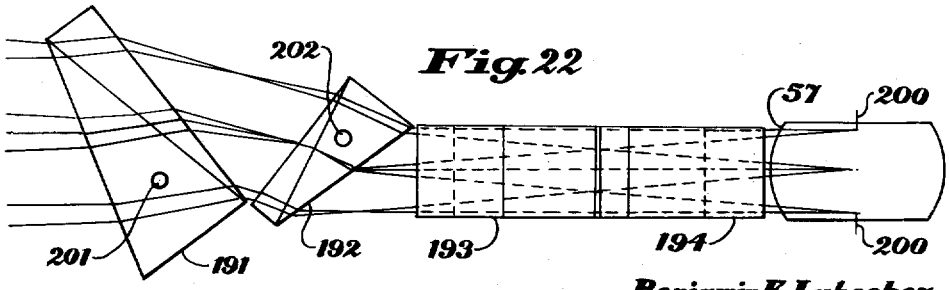

Figs. 21 and 22 are plan view and elevation of the same system set at a different magnification.

Figure 23:
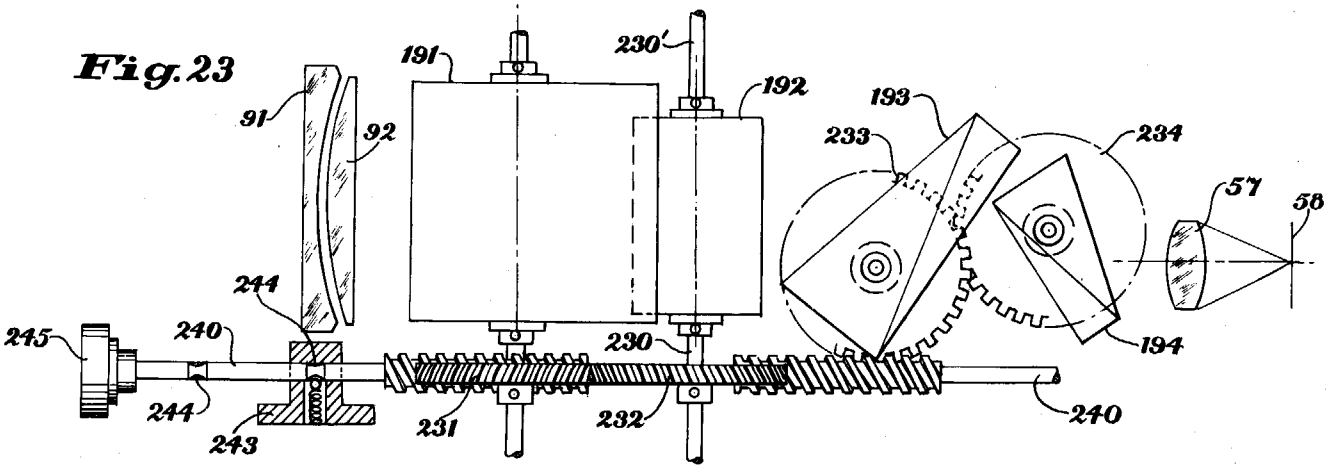
Figure 24:
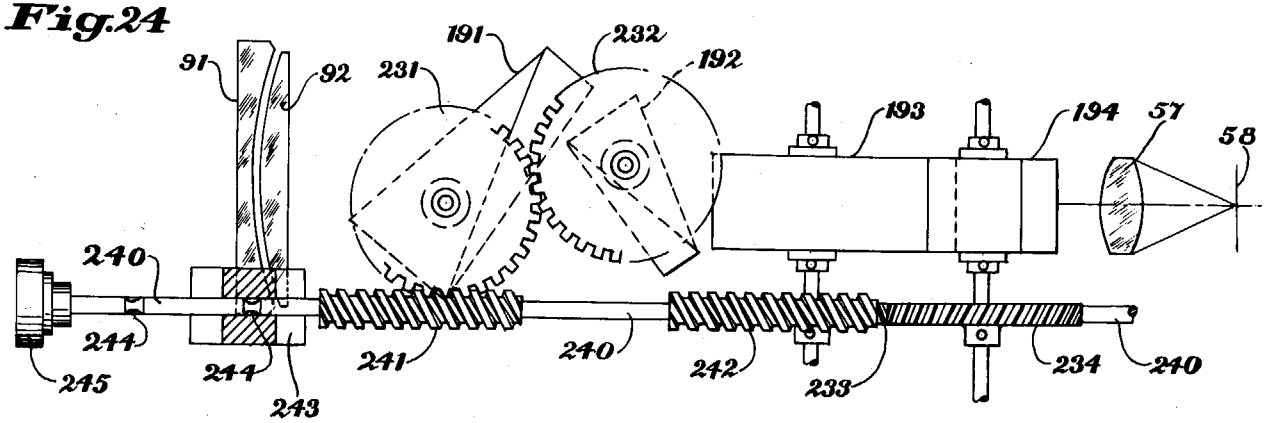

Figs. 23 and 24 are plan and elevation views of the same zoom system showing one mechanical arrangement for rotating the prisms.

Figure 25:
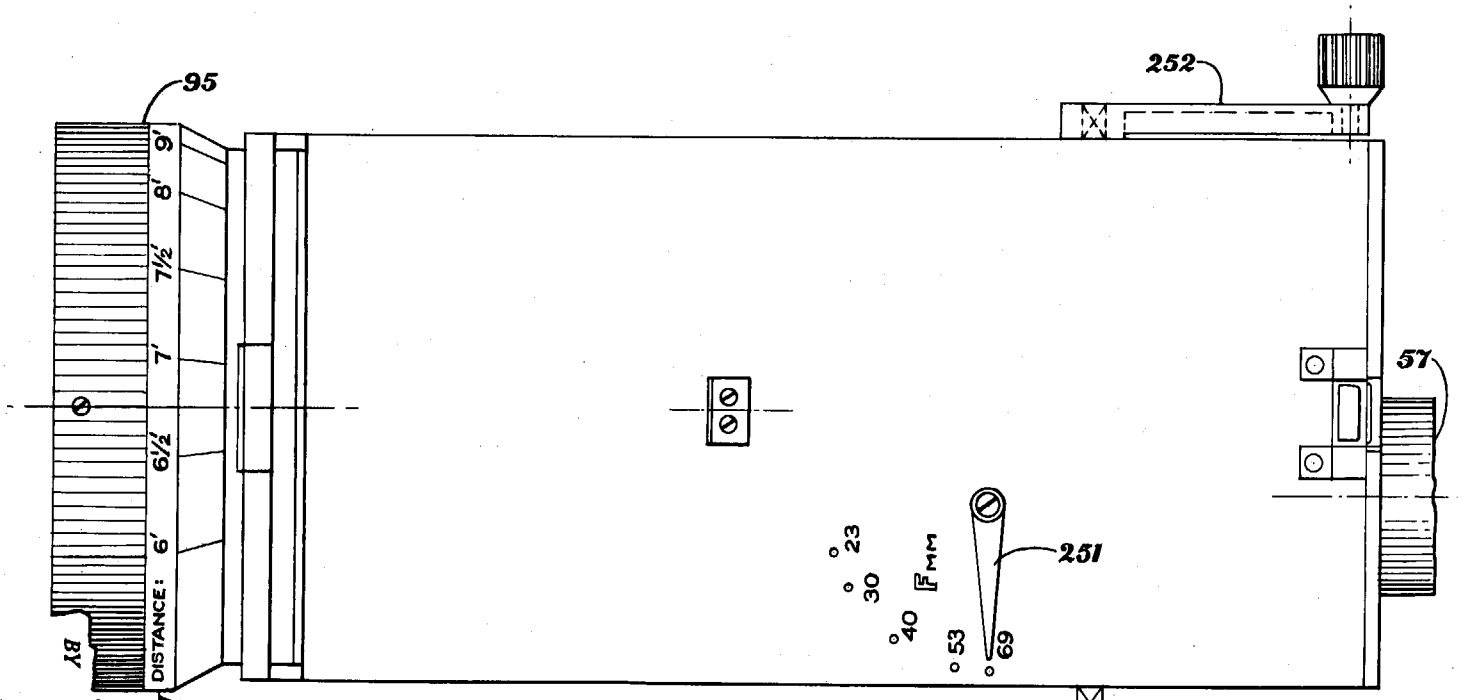

Fig. 25 is a plan view of the housing of a similar zoom system having a somewhat different mechanical arrangement.

Figure 26:
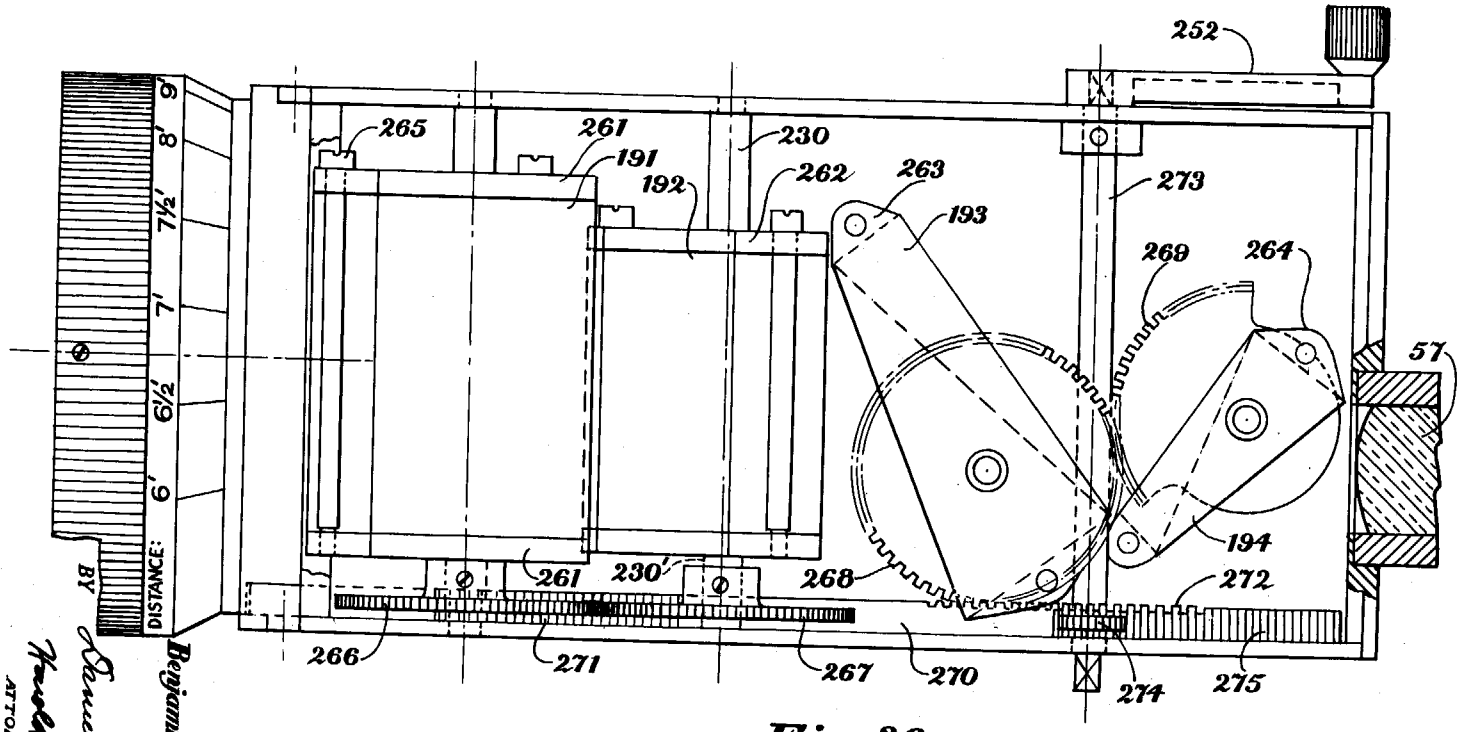

Fig. 26 shows the device of Fig. 25 with the top cover removed.

Figure 27:
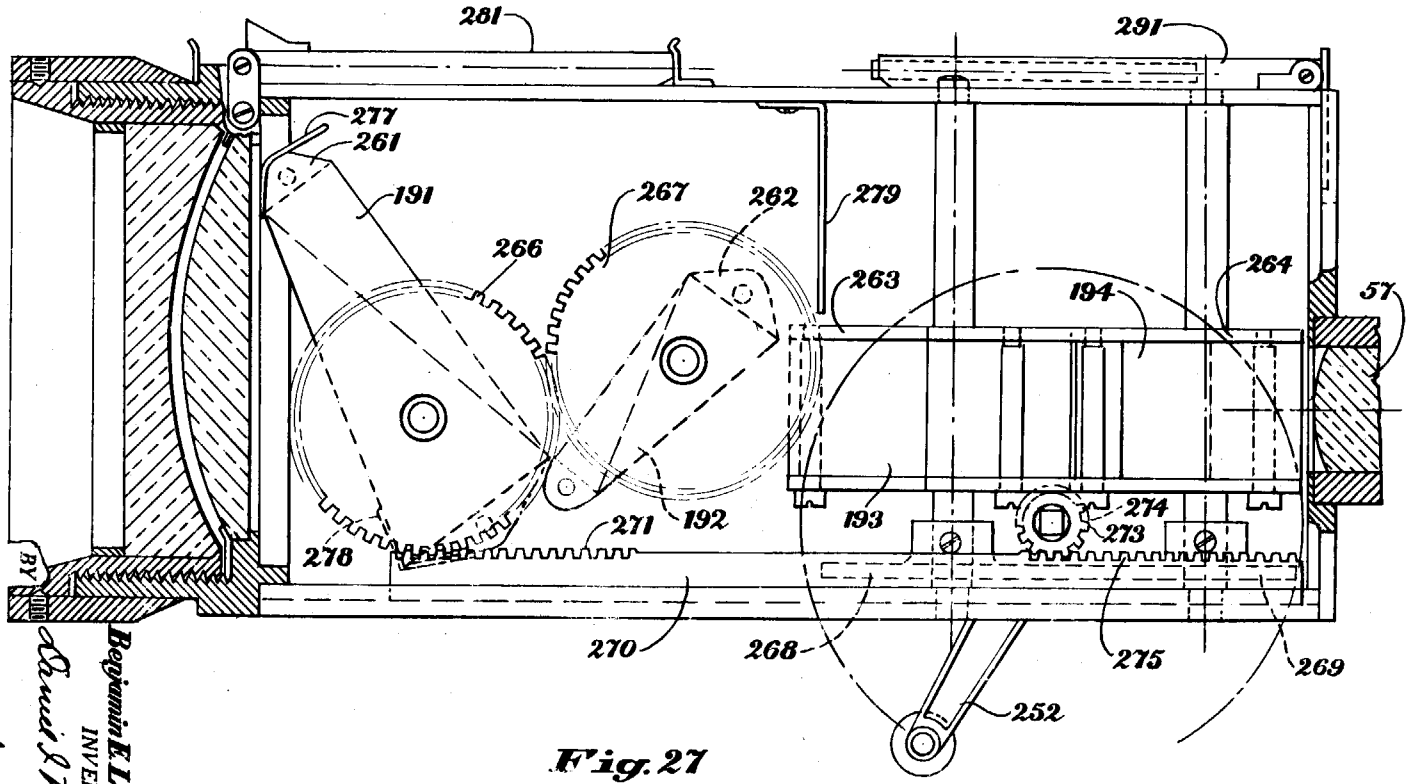

Fig. 27 is a left-hand elevation view of the same device with the left-hand cover plate removed.

Figure 28:
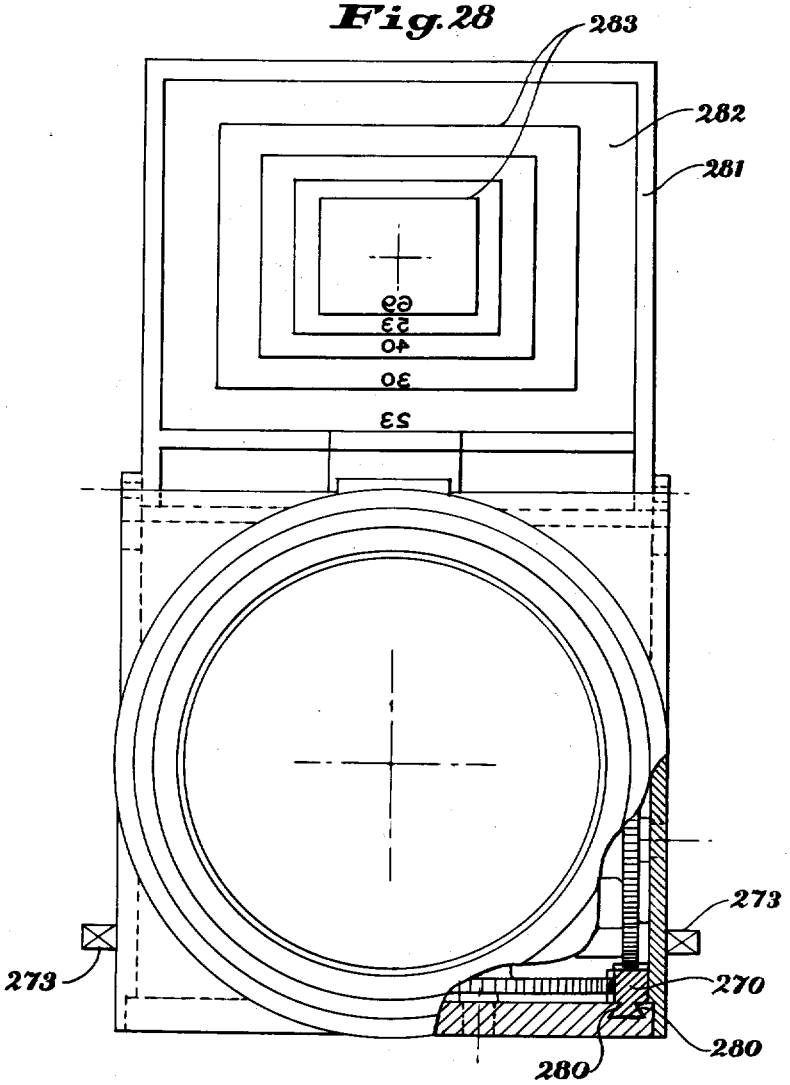
Figure 29:
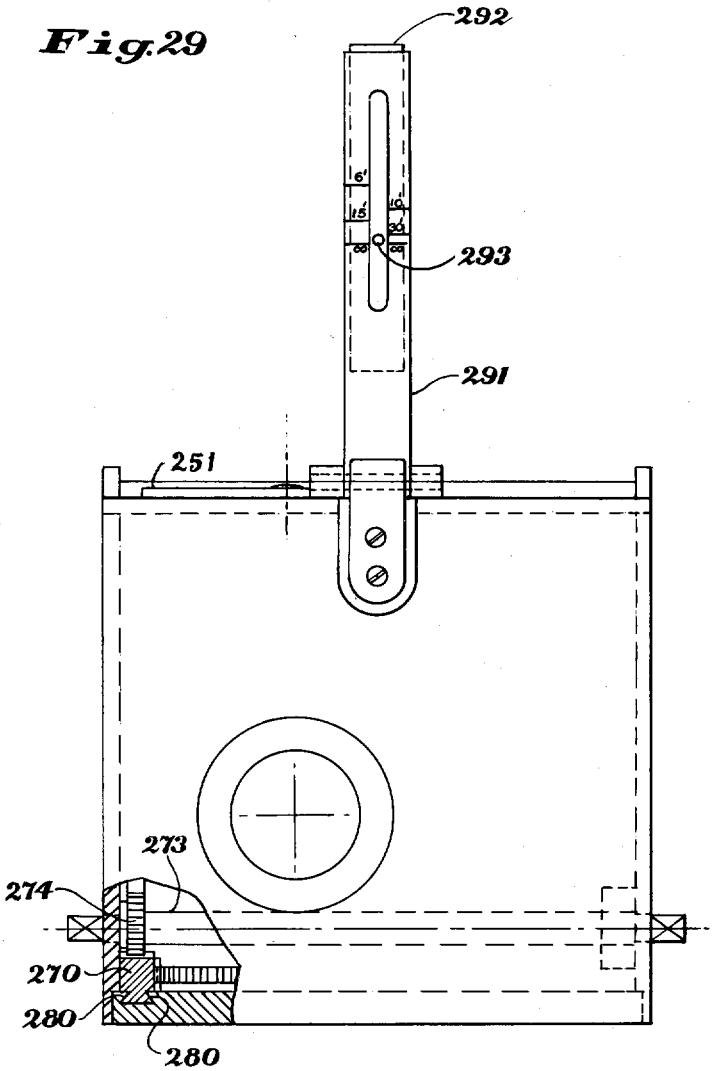

Figs. 28 and 29 are front and rear views of the same device partly broken away.

Before proceeding to a detailed description of different forms of the invention, the theory of prism magnification will be discussed in some detail.

THEORY OF PRISM SYSTEMS

In the following discussion of prism magnification the phenomenon will first be considered as a general property of plane surfaces bounding media of different refractive index and traversed by a plane wave-front not parallel to the surface, before considering the prism as a whole. Regarded in this way an important fact immediately emerges, namely, that an enlargement always results when passage is from a medium of higher index to a medium of lower index, and minification always results in the reverse case. This, as will be shown in due course, is the basis of my present invention and enables me to produce well corrected systems of moderate magnification.

Briefly, according to my invention, pairs of plane surfaces in opposite orientation, and separating media of appropriate refractive index are utilized to give additive effects in regard to magnification (or minification) but subtractive effects in regard to aberrations.

In the development of the theory, only rays parallel to the plane of the paper and plane surfaces at right angles thereto, will be considered; then the effects will be considered in connection with plane surfaces in other orientations, but always with the planes containing incident and refracted rays at right angles to the refracting planes.

Figure 1:
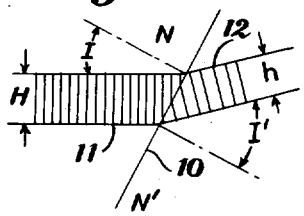
Fig. 1 is a diagram explaining the origin of prismatic magnification or plane surface magnification.

In Fig 1 a bundle of parallel rays 11 (or a plane wave front) proceeding from the left in a medium of index N traverses a plane surface 10 inclined as shown and passes into a medium of lower index N′ as bundle 12. The rays are all bent away from the normal according to the law of refraction. The constriction of the beam from original width H to width h (in the plane of the diagram) is a measure of the magnification M. If we reverse the direction of the light we obtain a minification $$m=\frac{1}{M}$$

If the inclination of the surface 10 in Fig. 1 be [revered] *reversed* in regard to the incident light the magnifications in the two cases remain identical.

The following relationships hold for a single refracting surface:

$$M=\frac{H}{h}=\frac{\cos I}{\cos I'}$$

where:

I=angle of incidence
I′=angle of refraction when the light is passing from left to right.

In the case when N<N′ or if the direction of the incident light be reversed:

$$m=\frac{h}{H}=\frac{\cos I'}{\cos I}$$

In practice, since external boundary surfaces are a necessity, prisms must be utilized. However, simple useful formulae for the deviations of prisms of various proportions in diverse orientation have not been obtained and it is found easier to treat them surface by surface. The total magnification, due to all the refractions, is then obtained by multiplying together all the magnifications found for each individual surface as indicated above. The total deviation due to a series of surfaces or prisms does not, by itself, given any indication of the value of the magnification.

The general formula for the magnification of several consecutive surfaces is easily derived from the formula for a single surface:

$$M=\frac{\cos I}{\cos I'}$$

and is $$M\ \text{resultant}=\frac{\cos I_1\times\cos I_2\times\cos I_3\times\ \ldots}{\cos I'_1\times\cos I'_2\times\cos I'_3\times\ \ldots}$$

the surfaces being numbered by subscripts in order from left to right.

Figure 2:
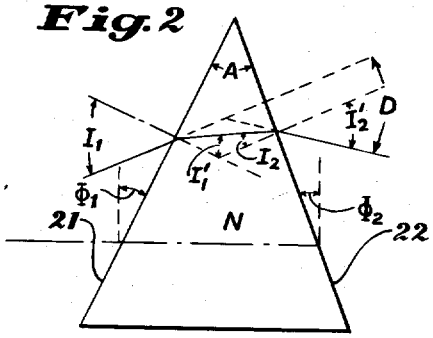
Fig. 2 is a diagram defining terms.

Fig. 2 shows a single prism having a refractive index

N, a refracting angle A and surfaces 21 and 22. In this case:

$$M\ \text{prism}=\frac{\cos I_1}{\cos I'_1}\times\frac{\cos I_2}{\cos I'_2}=m_1\times M_2$$

and the cosines are obtained from the sines by a known formula. When this prism is rotated about an axis parallel to the refracting edge the values of the deviation D and the magnification M change. At the symmetrical position D is a minimum and M is unity. Rotation in one direction magnifies the image and in the other direction minifies it.

Figure 3:
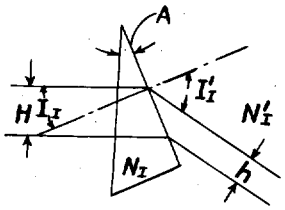
Figs. 3 and 4 are diagrams showing the effect of changing the orientation of a prism.
Figure 4:
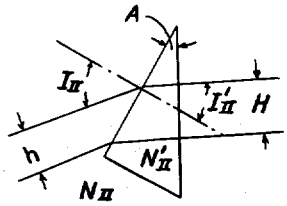

Figs. 3 and 4 show two special cases in which one of the prism faces is traversed normally (i.e. orthogonally) by the light beam and the refraction takes place at the other surface. Fig. 3 shows what I call position (I) in which the entry face is traversed orthogonally, and Fig. 4 shows position (II) in which the exit face is traversed orthogonally. In these special cases it is easy to derive simple formulae for magnification which are useful for comparing various systems during design. With the prism in all other unsymmetrical orientations, it is necessary to trace rays trigonometrically through the system and apply the general formulae to each surface. The special formulae are:

In position (I) Magnification=M $$M=\frac{H}{h}=\frac{\cos I_I}{\cos I'_I}=\frac{\cos A}{\cos I'_I}$$

$$M=\frac{\cos A}{\sqrt{1-(N_I/N'_I)^2\sin^2 A}}$$

In position (II) Minification=m $$m=\frac{h}{H}=\frac{\cos I_{II}}{\cos I'_{II}}=\frac{\cos I_{II}}{\cos A}$$

$$m=\frac{\sqrt{1-(N_{II}/N'_{II})^2\sin^2 A}}{\cos A}$$

For either position in air, N=index of prism $$N'_I=N_{II}=1$$
$$N_I=N'_{II}=N$$
$$I'_I=I_{II}$$
$$I_I=I'_{II}$$

$$M=\frac{\cos A}{\sqrt{1-N^2\sin^2 A}}=\frac{1}{m}$$

In the practical designs of my systems it is more convenient to use formulae for $M^2$ or $m^2$ rather than for M for two reasons. In the first place I use pairs of cooperating prisms (or surfaces), and then the square gives the total effect due to the two identical systems, and in the second place the square is a measure of the range R of magnification obtainable with a single prism moved from position II to position I.

Thus if: $R=M^2=M/m$ $$M^2=\frac{\cos^2 A}{1-N^2\sin^2 A}=\frac{1-\sin^2 A}{1-N^2\sin^2 A}$$

$$\sin^2 A=\frac{1-M^2}{1-N^2M^2}$$

$$N^2=\frac{\sin^2 A+M^2-1}{M^2\sin^2 A}$$

These formulae enable one of the unknown quantities to be determined when the others are known.

Since R and M are functions of N/N′ (or N in the case of a prism) and since N varies with light of different colors, R and M must be expected to vary with color also. In conformity with the usual methods of analysing total aberrations into convenient component parts and by analogy with lens systems, I call this effect "chromatic difference in magnification." This chromatic difference in magnification is quite small at the magnifications and minifications herein considered and becomes substantially zero all over a small field angle when M=1 (i.e. in the symmetrical position of the prism); it is also equal to zero at the exact center of the field at all magnifications. This aberration will be discussed in greater detail later in this and my co-pending specifications.

There is in addition an unsymmetrical lateral chromatic aberration which I prefer to call unilateral color; this is very large even in the M=1 position and must be corrected if a useful afocal system is to be produced. The manner of doing this for individual prisms in the minimum deviation position is well-known to the art and involves the use of cemented achromatic prisms made from glasses of suitably differing dispersive powers. My invention does not preclude this method of correction, but as will be shown simple prisms are acceptable in some forms of the invention.

After the chromatic aberrations have been eliminated or reduced to acceptable values, another serious aberration remains, which (except in the case of astronomical telescopes where the field of view is minute) must be corrected. This concerns the large amount of distortion introduced by a refracting prism and this exists even in the minimum deviation position where the magnification is unity. Since the magnifications in different parts of the field depend upon the angles of incidence and these are different for different parts of the field, it is clear that the effect cannot be ignored.

According to the present invention both the unilateral chromatic aberration and the distortion are simultaneously corrected by the use of oppositely oriented surfaces or prisms. The way in which the balancing of desired effects against undesired ones is carried out in the formation of afocal systems, is discussed in more detail below and in the copending applications mentioned at the beginning of this application.

Occasionally it is necessary to know how to orient a prism of given apex angle in regard to the incident rays to produce a given deviation, or to compute the deviation for a given orientation. The general formula is as follows.

Referring to Fig. 2, which shows the general case of a prism traversed by a ray in the plane of the paper, the refractive index of the material of the prism is N and the apex angle is A. Angles of incidence and refraction at surface 21 are $I_1$ and $I'_1$, and for surface 22 $I_2$ and $I'_2$. These angles are given the positive sign in numerical calculations using the formula below when a rotation of the ray into the normal to the surface would be clockwise. Thus, in the case illustrated $I_1$ and $I'_1$ are positive and $I_2$ and $I'_2$ negative. D is always negative according to the present sign convention. The formulae then are as follows:

$$D=A+I'_2-I'_1$$

$$\cos(2I_1-A+D)=\frac{1-N^2\sin^2 A-\cos A\cos(A-D)}{\cos(A-D)-\cos A}$$

FIXED MAGNIFICATION FORMS OF THE INVENTION

Figure 5:
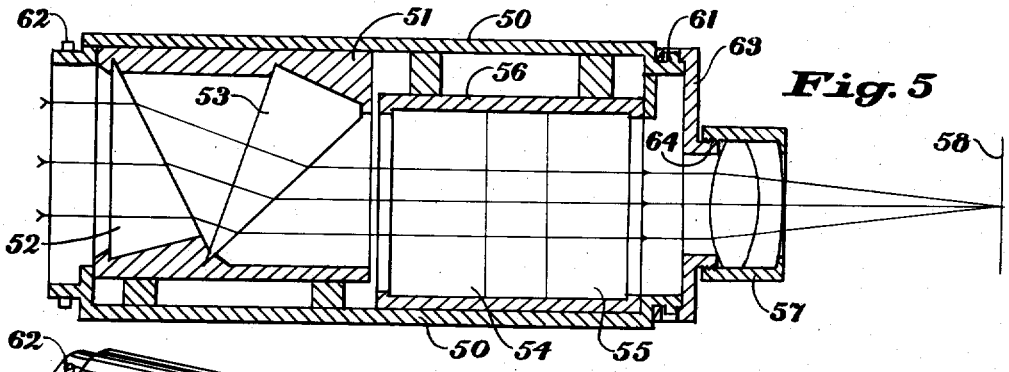
Fig. 5 is a vertical axial section of a system having fixed magnification, according to the invention.

Fig. 5 shows in vertical cross section a simple basic form of my invention. Within a tube 51, two prisms 52 and 53 are mounted so that the first surface of the first prism is traversed orthogonally by rays parallel to the axis, the second surface providing all of the refraction. The diverted rays next meet orthogonally the first surface of the second prism, traverse the prism and are refracted at the second surface thereof. The rays therefore enter and leave parallel to the axis (since the two prisms are identical and in opposite orientation in regard to the light traversing them). The dispersion of the first prism is balanced by the dispersion of the second prism except for second order effects so that unilateral chromatic aberration of the first order is removed. On the other hand the magnification due to the two prisms is $M^2$ if M is the magnification due to each in the orientation chosen. However, the chromatic difference in magnification is not corrected, but if the final magnification is small and a low-dispersion material is chosen for the prisms, it can be neglected. This question [wil] *will* receive further attention later in this specification.

Of course, the magnification due to prisms 52 and 53 takes place in the direction of the plane of the paper only, since the constriction of the beam occurs in this direction. A second identical pair of prisms 54, 55 in a second tube 56 is therefore added but at right angle orientation about the axial rays emerging from prisms 53 so as to give the same magnification $M^2$ in the direction perpendicular to the plane of the paper. The resultant effect of the two systems acting together is to give a substantially uniform magnification $M^2$ in all planes around the axes. The whole prism assembly is mounted in a tube 50 in front of an objective lens 57 and has the effect of increasing the focal length and therefore the size of the final image in focal plane 58 in the ratio of $M^2$ to 1.

Now let us imagine the prism assembly to be reversed end for end, then the effect of the device is to produce minification instead of magnification. This minification is equal to $1/M^2$, or to use its own symbol, $m^2$. The total range $R_T$ in magnification between $m^2$ and $M^2$ in changing from one orientation to the other is $M^2/m^2$ or $M^4$.

Thus, denoting the focal length of the objective alone by F, then when the attachment is added in front of the lens the equivalent focal length of the combination becomes $F\times M^2$ in the orientation for magnification and $F/M^2$ in the orientation for minification. We have therefore, at our disposal besides the original objective, a telephoto attachment in one orientation and a wide angle attachment when it is reversed.

A prismatic magnification attachment according to the invention offers several important advantages over the more conventional lens attachment. In the first place the spherical aberration, coma, Petzval curvature and astigmatism are automatically corrected; the spherical aberration because the optical path length is the same for all rays, the coma because the sine condition is fulfilled, the curvature because all the surfaces are plane and contribute no Petzval curvature, and the astigmatism because all rays in each parallel bundle strike each surface at the same angle. The distortion is also found to be small. In the second place, this correction is not lost when the attachment is reversed, as is the case with lens attachments which depend upon the shapes, indices and separations of the elements for the correction of aberrations.

Figure 6:
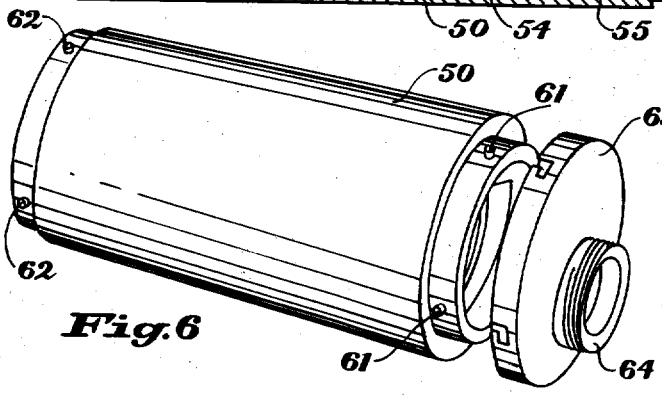
Fig. 6 is a perspective view of a mounting barrel for a system of the type shown in Fig. 5.

Fig. 6 is a partly exploded perspective view of a reversible attachment such as the one shown in Fig. 5. It may be noted that the corners of the prisms should be rounded for convenient mounting in the cylindrical tube 50. The tube 50 is fitted with studs 61 at one end and similar studs 62 at the other end for attaching either end to a cap 63 by means of a bayonet joint. The cap 63 is provided with a threaded ring 64 for attaching the whole apparatus to the front of an objective lens 57. This ring 64 is eccentrically located to allow for the displacement of the axis by the prisms, and the studs 61, 62 are irregularly spaced around the circumference to assure the correct orientation of the prisms.

Figure 7:
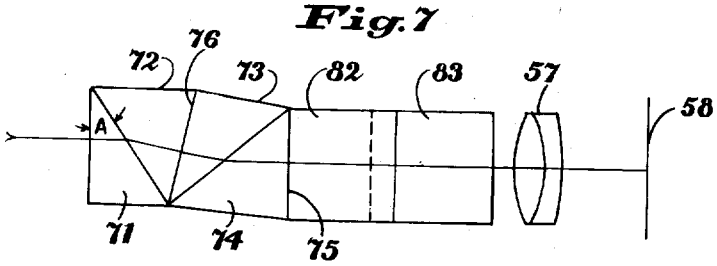
Figs. 7 and 8 are plan and elevation views of a system according to the invention in which the prisms make up a solid block.
Figure 8:
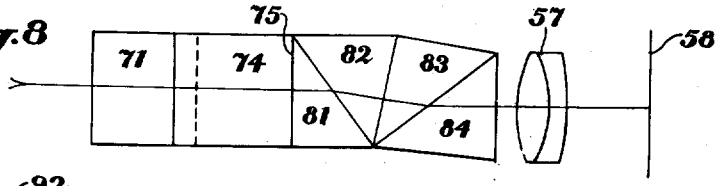

Figs. 7 and 8 show in plan and elevation a special form of the invention, useful in certain cases where rigidity is essential, in which the prisms are cemented together to form a solid block. In this case, materials of differing refractive index are used and for a maximum magnification with reasonably small prism angles the ratio of the higher index to the lower must be as high as other considerations will allow. In some cases it is possible to use V values for correcting chromatic aberrations also. As a rule, the prisms are alternately of high and low index.

As an example, a combination is shown using a very high index glass and the plastic "lucite" as a filling-in material to form the next adjacent prism. By cementing the two together, we avoid the necessity of forming an accurate optical plane surface on the plastic. The whole block can then be ground down to a circular or rectangular rod or other suitable external form.

First, the slopes of the various plane surfaces are determined. This is quite simple using the formulae given above for the refracting surface in each pair, and remembering that the entering and emerging (axial) rays are orthogonal to their respective surfaces. There are two glass prisms 71, 73 and two Lucite prisms 72, 74 for horizontal deviation, and an identical system 81, 82, 83, 84 for the vertical plane. The two systems are cemented together along the surface 75. The glass is made by the Eastman Kodak Company and identified as No. EK 448. The plastic is a methyl methacrylate known as Lucite. These materials have the following optical properties.

| | $N_C$ | $N_D$ | $N_F$ | $\delta N$ |
|---|---|---|---|---|
| EK 448 | 1.8742 | 1.8804 | 1.8956 | .0214 |
| Lucite | 1.4916 | 1.4945 | 1.5008 | .0092 |

The apex angle of the glass prism 71 is obtained by the formula already given for an $M^2=1.494$:

$$\sin^2 A=\frac{1-M^2}{1-\left(\frac{N_1}{N^2}\right)^2 M^2}$$

$$\sin A=.6016 \text{ and } A=37.0° \text{ (approx.)}$$

Since the angle A is also the angle of incidence at the second surface of this prism the angle of refraction I′ is obtained from:

$$\sin I'=\frac{N}{N'} \qquad \sin A=.757$$

and $$I'=49.2°$$

Then the angle that surface 76 between prisms 72 and 73 makes with the vertical for orthogonal passage of the rays is:

$$49.2°-37.0°=12.2°$$

and the apex angle of the second prism 72 is 49.20°. The three succeeding pairs of prisms are identical with this in apex angles, but the third and fourth pairs are turned 90°. We shall check the chromatic difference in magnification. To find the formula for this we take the derivative of $$\frac{1}{M^2}=\frac{1-N^2\sin^2 A}{\cos^2 A}$$

(obviously obtained from a previous formula by taking reciprocals) and arrive at the following convenient formula:

$$\delta M^2=M^4\delta N^2\tan^2 A$$

In the present example:

$$\delta N^2=\left(\frac{N_1}{N_2}\right)^2_F-\left(\frac{N_1}{N_2}\right)^2_C=0.0163$$

when $\delta M^2=+0.0210$.

This is too great for photographic purposes, but for a visual telescopic system (e.g. a gunsight) of say 1° half angle of field (at the eye) this only amounts to a little over one minute of arc and so is quite negligible.

FOCUSING DEVICE

Figure 9:
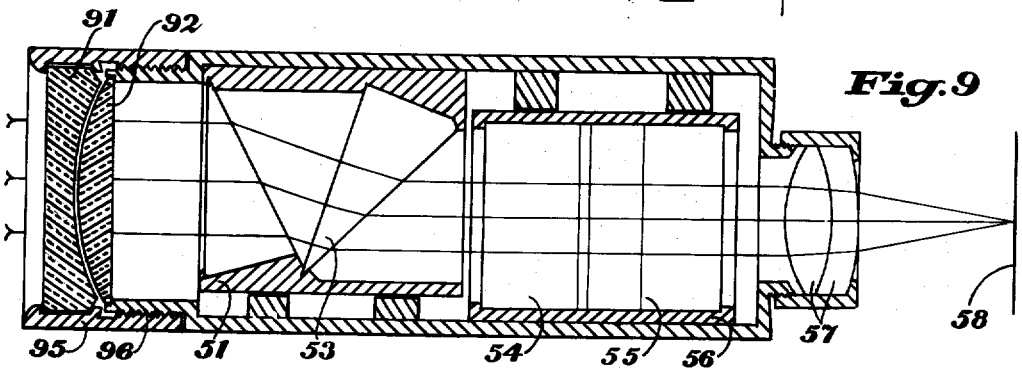
Fig. 9 is a vertical section of a fixed magnification system with provision for focusing on nearby objects.

Because the prism systems are theoretically free of certain aberrations discussed above only when working in parallel (or collimated) light, it is preferred that some kind of focusing arrangement be located in front of the prismatic system to collimate the light. The camera lens is, therefore, constructed without any focusing device and is fixed in the position required for objects at infinity. This considerably simplifies the design of the lens mounting so that the total cost is not necessarily increased by the provision of a special focusing device in front of the prisms. Fig. 9 shows such a focusing attachment of simple form mounted in front of a prism-lens system such as shown in Fig. 5. It consists of a plano-convex lens 92 located in a fixed position close to the prism assembly with the convex surface outwards, and a negative plano-concave lens 91 of equal or slightly lesser focal length located at a variable distance in front of the positive lens and having its concave surface towards the positive lens. Thus, when the curved surfaces of the two lenses are almost touching each other, the combination has an infinite focal length and the whole system is in focus for distant objects. Upon screwing the negative lens outwards (by means of the holding sleeve 95 and threads 96) the combination of the two lenses acquires a positive focal length so that diverging rays are rendered parallel. If the closest object distance is to be 6 feet the lenses are designed so as to give that focal length at the maximum lens separation that other considerations may dictate. Focusing is thus carried out by screwing the sleeve 95 back and forth between the limiting positions according to the distance of the object focused upon.

The orientation of the focusing device in regard to the incoming light and the prismatic system, is not critical from the point of view of paraxial theory; it is of importance, however, in connection with the perfection of the final image. That is why it is preferred that the negative lens be placed on the outside and the positive lens next to the prisms. With this orientation the curved surfaces are traversed by principal rays more nearly radially than in the reverse orientation. If in addition, the mean position of the centers of curvature of the proximate surfaces of the lenses, be located near the center of the entrance pupil of the optical system at the right of these surfaces, principal rays will traverse the surfaces almost radially, so that all parts of the object field will be depicted with approximately equal precision. Thus, in the attachments for miniature cameras described in connection with Figs. 19 to 22 below, the radius of curvature of the curved surfaces of lenses 91 and 92 are conveniently about 100 mm.; this gives reasonably thin lenses which do not require too great a separation for the closest object distances. Except for very critical work and with objects at unduly close distances, the focusing device needs no special optical corrections since it operates at a relative aperture of about f/100 under the worst condition.

Figure 10:
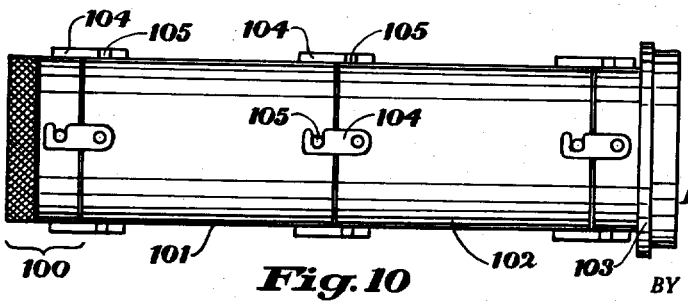
Fig. 10 shows a preferred embodiment in which two or more fixed magnification attachments are coupled together.

Fig. 10 shows another useful form of the invention which comprises two fixed magnification prismatic magnifying attachments 101, 102 removably, reversibly and interchangeably mounted in series in front of an objective 103, one having a magnification of M (e.g. 1.2) and the other $M^3$. The various combinations of one of the attachments alone or the two together as made up by individually reversing their positions give a choice of focal lengths of $F/M^4$, $F/M^3$, $F/M^2$, F/M, F, MF, $M^2F$, $M^3F$ and $M^4F$, thus providing a series of nine different focal lengths in geometrical progression, F being the focal length of the lens 103 alone. A focusing device 100, similar to that shown in Fig. 9 attaches to the front of the system. The hooks and pins 104, 105 are illustrative only, and any known method of reversibly connecting the units while preventing their rotation around the axis may be used instead.

It is to be understood that optionally a focusing device is provided with any prism system according to the invention, even though it is not shown in all the figures. It is preferred when near objects are to be focussed upon.

Figure 11:
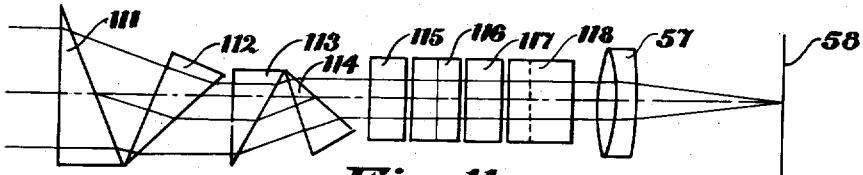
Fig. 11 illustrates an eight prism system which provides fixed magnification with no shift of the optic axis.

Fig. 11 is an optical diagram of a prism-lens system in which there is no displacement of the axis. It has been mentioned in reference to the preceding figures that the axis or line of sight is displaced laterally by each two-prism system. It may be noted, however, that for at least one ray through the prism system there is no angular deviation. (It will be readily understood that when a 10° fan of rays is magnified into say a 15° fan of rays the upper and lower extreme rays are usually deviated upward and downward, respectively, and that there is then a ray at or near the middle which is not deviated.) In the system shown in Fig. 11, there are four prisms 111, 112, 113, 114, magnifying in the plane of the diagram and a similar set of four prisms 115, 116, 117 and 118 magnifying in the perpendicular plane. The first two prisms 111, 112 form a system with little or no angular deviation of the axis but with some displacement thereof. The third and fourth prisms form a similar system which displaces the axis equally in the opposite direction and also balances out the deviation if any. Thus there is neither displacement nor deviation, and the axial ray proceeds in the line of its original path. The second system of four prisms, 115, 116, 117 and 118 operates in the same manner in the plane perpendicular to this, so that the final axis coincides with the initial axis, and the whole prism system is mounted in front of the lens 57 so that both these portions of the axis coincides with that of the lens.

Other advantages of this system are that at a given magnification the distortion is greatly reduced or that systems of higher magnification can be achieved. Since my systems are practically devoid of other monochromatic aberrations the latter advantage is of greater importance, especially in systems covering a small angular field. It will be noted that useful systems according to the invention can be made up in which the displacement is only partially corrected by the second pair of prisms in each set of four. For example the second pair can be made smaller to make the system more compact and still gain the increase in magnification or reduction in distortion.

The following formulae are useful for systems having any number of pairs of prisms. Thus, if we want a certain total range of magnification $R_T$ for a given number of identical prisms n $$R_T = M^{2n}$$

since $M^2$ is the range in magnification for a single prism when moved from position (I) to position (II). (Figs. 3 and 4.)

With a total of eight prisms, four for each plane, n=4 and if we want a total range of 2.5:

$$R_T = 2.5$$
$$M^8 = 2.5$$

and $$M = \sqrt[8]{2.5} = 1.121$$

This is a very moderate contribution by each prism to the total when each prism is in position (I). In position (II) the contribution is 1/1.121. If the instrument is to be used alone as a telescope the minification is of no interest and an M of 1.121 would only give a total magnification of $M^4$ i.e. 1.581 times. For the small field of view of a telescope we can easily increase M to 1.78 in which case $M^2=3.163$ and $M^4=10$, and this is the total magnification available. Of course, with this magnification the chromatic difference in magnification would need correction, but for the smaller magnifications suitable for camera and projector attachments it is sufficient to choose the right kind of optical material. This means, in practice, that a material with the lowest possible dispersion (i.e. highest possible "V" value) should be employed, provided the index of refraction for "brightest light" is high enough for the required magnification (or range) without having to employ too many prisms of large apex angle. Experience and trial decide which choice to make bearing in mind the purpose for which the device is being designed.

By way of example, we shall design a reversible prismatic system of the type shown in Fig. 5 for a 40 mm. lens for a 16 mm. movie camera and with a magnification range of 2.50 so as to give resulting focal lengths of 25 mm. and 63 mm. in the different orientations and, of course, 40 mm. without the attachment. For the material of the prisms we choose the mineral fluorite since this has the lowest dispersion of any material available and can now be obtained in sufficiently large pieces (synthetic fluorite) and at a cost which is not prohibitive. The following are the optical properties of this material.

| $N_C$ | $N_D$ | $N_F$ | V | $\delta N = N_F - N_C$ |
|---|---|---|---|---|
| 1.43249 | 1.43384 | 1.43705 | 95.1 | .00456 |

The chosen range of 2.50 gives $M^2=1.5811$ and $m^2=1/1.5811$ (for each pair).

To find the prism angle necessary to obtain these values with an $N_D$ of 1.43384 we use the formula already given:

$$\sin^2 A = \frac{1-M^2}{1-N^2M^2}$$

$$\sin A = .50815 \text{ and } A = 30.36°$$

Actually we could use an angle of 30° exactly (since this is more easy to manufacture) and tilt the prisms a little beyond the two positions shown in Figs. 3 and 4 from which the formula was derived.

In order to determine the magnitude of the uncorrected chromatic difference in magnification we shall use the same formula as before:

$$\delta M^2 = M^4 \delta N^2 \tan^2 A$$
$$= 2.5 \times 0.0131 \times 0.3497$$
$$= 0.0115 \text{ (approx.)}$$

At a distance of 5.5 mm. from the center of the picture the lateral color is:

$$5.5 \times 0.0115 = 0.063 \text{ mm. (approx.)}$$

This is within permissible limits for some purposes, but for very sharp definition it should be improved further by methods described below or by methods given in Serial Nos. 498,167 and -8.

It may be pointed out that my invention is not limited to the case where one surface of a prism is traversed orthogonally; that position of the prism has been treated at length since it permits easy and useful formulae to be derived. Also, these positions generally approximate a convenient practical limit for magnifications and minifications. In fact, orthogonal traversal of one surface gives the maximum magnification or minification considered as a function of the refracting angle A while the angle of incidence at the other surface is maintained constant. Other orientations, except the symmetrical one, also give magnification and minification and can be usefully employed according to my invention.

Figure 12:
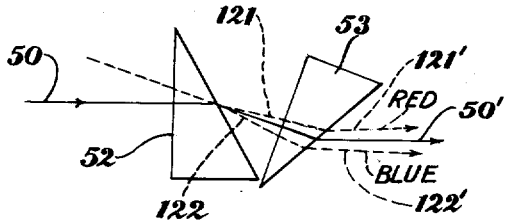
Figs. 12 and 13 are diagrams to aid in the explanation of the cause and correction of unilateral color.

Fig. 12 is a diagram showing the cause of the unilateral color aberration which has been mentioned before and which causes the red image to be displaced as a whole relative to the blue image. A ray of white light 50 strikes the first prism 52 and is refracted and fanned out into a spectrum from the red ray 121 to the blue ray 122. The dispersion is greatly exaggerated in the diagram. These rays strike the second prism 53 and are bent back to the positions 121', 122', substantially parallel to the axis. The two prisms may be assumed to have equal apex angles and refractive indices, and the second prism to be oriented so that the median ray 50' emerges parallel to its original path 50. The blue ray 122, however, strikes the second prism at an angle which is closer to the angle of minimum deviation and so is swung back less than the median ray and still less than the red ray 121 which strikes still farther from the angle of minimum deviation. The net result is that the colors continue to fan out after leaving the second prism, although to a much smaller degree than after the first prism. This causes a one-sided lateral color aberration at the axis and to some extent over the entire field, hence the name "unilateral." The second set of prisms, not shown in Fig. 12, cause a similar aberration in the plane perpendicular to this, so that the final resultant is a unilateral color aberration at 45° to the plane of the diagram. A means for correcting this aberration is disclosed in my copending application, Serial No. 498,168 already mentioned. For many uses, however, the effect is too small to be objectionable.

Figure 13:
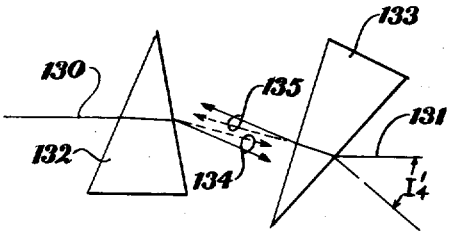

Fig. 13 is a similar diagram showing a pair of prisms in which the unilateral color is corrected although generally the axis is deviated slightly in order to attain this result. A prism 132 is traversed from left to right by a white ray 130 which is then spread out into a spectral fan 134. An identical prism 133 in the inverted position can then be so positioned that a white ray 131 traversing it from right to left is spread out into a spectral fan 135 of exactly the same angular spread as the fan 134. The two extreme colors then proceed through both prisms in either direction and emerge as an exactly parallel pair of rays. The intermediate colors deviate extremely little if at all from this parallel pair. The mathematical analysis of the deviation of the intermediate colors to show whether or not their deviation is exactly zero has not been carried out. In many cases the unilateral color can be corrected even though the two prisms are not identical as to glass or as to refracting angle.

The difference between Figs. 12 and 13 may appear to be slight but it is very important in designing properly corrected systems. In Fig. 12 the prism 52 is positioned so that a white ray 50 traverses its first surface orthogonally, and the second (inverted) prism 53 is similarly positioned so that its first surface is traversed orthogonally by a median colored ray. This symmetrical disposition of the two prisms in regard to a median ray (which is, of course, included in the white ray 50) causes the ray to emerge at 50' in a direction parallel to its direction of entry. It has been shown above that this results in a fanning out of the colored rays into a spectrum as they finally emerge from the prisms thereby producing unilateral color. Although Fig. 12 shows only a particular case, this is the general result whenever two identical prisms in inverted relationship are so positioned that a median (or any other specific) colored ray traverses them both identically.

The remedy lies in increasing the dispersion of the prism 53 relatively to that of 52, either by rotating 53 further from its position of minimum deviation, or by increasing its apex angle, or by changing the material to one of higher dispersion. Fig. 13 shows how the two prisms 132 and 133 must be positioned in regard to each other in order to remove the unilateral color. The correct positions are most easily determined in practice by plotting curves for the dispersion at different prism orientations.

THEORY OF ZOOM SYSTEMS

Zoom systems are made up by mounting the prisms 52, 53, 54, 55 of Fig. 5, so that they individually pivot about axes parallel to their refracting edges and providing means for rotating them in unison around their axes so that the magnifications produced by the individual prisms increase and decrease together. Certain problems arise in designing these systems due to the variation of the aberrations with magnification, and these problems will now be considered, along with the related problem of the deviation or wandering of the axis.

Figure 14:
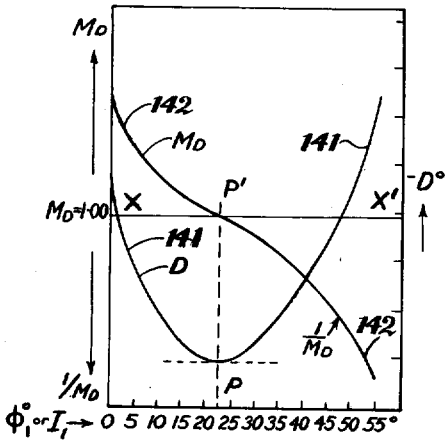
Fig. 14 is a graph showing the deviation and magnification of a prism at different angular positions.

Fig. 14 shows a typical curve 141 showing the way in which the deviation D (see Fig. 2) varies with the angle $I_1$ of the first surface of a given prism to the incident light. With the angle conventions adopted the deviation for a single prism, in base-down orientation, always has a negative sign. This remains true whether the light traverses the prism from left-to-right or from right to left, but the sign changes when the prism is inverted. With the light passing from left to right and parallel with the optic axis, $\phi_1$, is identical with $I_1$ for the first prism, where $\phi_1$ is the angle the first surface makes with a plane perpendicular to the optic axis. In this specification the symbol $\phi$ (with suitable suffix) is used to indicate the angle between a plane surface and an imaginary plane perpendicular to the optic axis, with the sign convention that $\phi$ is numerically positive when a rotation of the plane surface in an anticlockwise direction would bring it into coincidence with said imaginary vertical plane. If the rotation must be clockwise $\phi$ is numerically negative. Thus in Fig. 2, $\phi_1$ is positive and $\phi_2$ negative. Since the apex angle $A_1$ of the prism is constant the angle $\phi_2$ that corresponds with $\phi_1$ can always be found from: $A_1=\phi_1-\phi_2$. As might be expected the deviation curve is asymmetrical about an ordinate (PP') representing the position of minimum deviation. This lack of symmetry in the curve arises from the manner in which the quantities are plotted, but it is at first sight misleading since the prism is absolutely symmetrical about a plane bisecting the apex angle. From a series of curves, such as curve 141 shown in Fig. 14, but for prisms having different apex angles and made from different materials, it can be shown that the effect of increasing the apex angle $A_1$ is to move the whole curve upwards and to the right as well as to make it steeper; decreasing $A_1$ has the opposite effect. Alterations in the power of the prism by altering the mean index of refraction has a similar effect to altering the apex angle. Increasing the index moves the curve upwards and to the right and vice-versa.

THE MAGNIFICATION

Fig. 14 also shows a typical curve 142 showing how the magnification of the same prism varies with the angle $I_1$. The manner of plotting the magnification curve is rather unusual but it is very convenient for practical design purposes. The base line XX' is drawn at $M_D=1$ so that magnifications appear above the line as indicated and minifications (as $1/M_D$) below the line. In other words when the magnification becomes less than one its reciprocal is plotted downwards from XX'; thus, the words "magnification" and "minification" are not here used to mean "enlarged" or "diminished" but $M_D$ and $1/M_D$ respectively so that when we reverse the direction of passage of the light (from left-to-right to right-to-left) the descriptive words may [means] *mean* the opposites of what they appear to mean (since the curves become inverted on the diagram), while the terms $M_D$ and $1/M_D$ remain the same by definition. This must be kept in mind when considering combinations of prisms in different orientations.

THE UNILATERAL CHROMATIC ABERRATION

Figure 15:
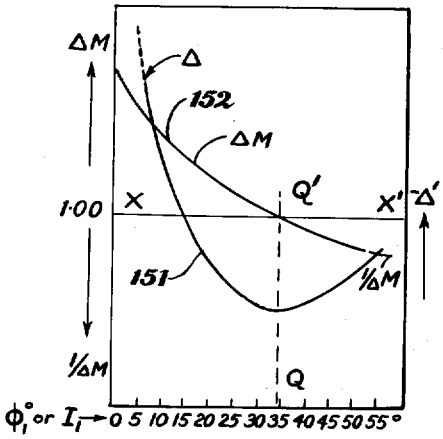
Fig. 15 is a similar graph showing the chromatic differences in magnification and in deviation of the same prism.

Fig. 15 shows a curve 151 giving the unilateral chromatic aberration as a function of the angle $I_1$. This aberration, designated by $\Delta$ is the difference between the deviation of the F rays of the spectrum and that of the C rays; with the sign convention adopted it always comes out negative for a prism in the base-down position and positive for a prism in the base-up position irrespective of direction of light passage. The minimum value of $\Delta$ occurs at a value of $I_1$ designated by Q. Increasing the apex angle $A_1$ moves the curve upwards and towards the right at the same time making it steeper; increasing the mean refractive index has a similar effect, but changes in the dispersion for a given mean refractive index (i.e. changes in the V value) are of the greatest practical importance. Thus, a decrease in the value of V moves the position of Q to the right and thus away from P while an increase in the V-value brings Q closer to P and also gives a more symmetrical $\Delta$ curve. This, as will be seen later, has an important bearing on the possibilities of simultaneously correcting for deviation and dispersion in a twin prism system.

THE CHMOMATIC DIFFERENCE IN MAGNIFICATION

Fig. 15 also gives a curve 152 of the chromatic difference in magnification as a function of the angle $I_1$ with the light traversing the prism from left to right. The curve becomes inverted when the direction of light passage is reversed, but not when the prism is inverted. This like the magnification curve of Fig. 14 is plotted upon a base line XX' representing $M_F/M_C=1$, where $M_F$ and $M_C$ are the magnifications for the F and C rays respectively, so that values of $M_F/M_C$ (or $\Delta M$) are plotted above the line and (when these would becomes less than one) the values of $M_C/M_F$ (or $1/\Delta M$) are plotted below the line. This kind of curve is convenient for design purposes and enables the point of intersection of the curve with the XX' line to be definitely located; this gives the value of $I_1$, for which both $M_F/M_C$ and $M_C/M_F$ are equal to one. It is found in practice that this value for $I_1$ is close to (if not the same as) the location of Q in Fig. 15 for any given prism. That is to say that the prism orientation for minimum dispersion is close to that for which there is no chromatic difference in magnification. Whether or not there is any theoretical basis for this has not yet been investigated. An important point to note is that with all existing optical materials the prism orientations for minimum deviation and for minimum dispersion are not identical for any one simple prism. Thus P and Q are not coincident and Q is always greater than P. This difference depends primarily upon the V value of the prism material—the greater the V value the less the difference. The magnitude of the difference (Q—P) also increases with increase in prism apex angles as well as with increase in the mean index of refraction.

CORRECTION OF ABERRATIONS

For further discussion, all the curves of Figs. 14 and 15 are superimposed upon the same diagram in Fig. 16, the scale for $I_1$ being identical for all while the scales for the ordinates of the curves and the positions of their zero (or base) lines are chosen for convenience; this should be kept in mind if a totally false conception of the quantitive relationships is to be avoided. Thus, for example, the scale for the $\Delta$ curves may be sixty times that for the D curves and in practice it is convenient to plot minutes of arc for one and degrees for the other. Similar conditions prevail for the M and $\Delta M$ curves. These curves simplify the problem of determining the orientations of each prism (in a pair of identical prisms in inverted relationship) which will give the required freedom from one, or several, of the aberrations to which the system is subject. At the same time the curves enable us to determine the magnitude of the remaining errors at each orientation and the magnification range for which the aberrations remain within specified tolerances. In other words the curves enable us to design a "zoom" system having the required characteristics. If, as is usually the case, the desired conditions cannot be realized with the prism material and apex angle first chosen, further families of curves like Fig. 16 must be calculated on the basis of theory and experience until a satisfactory design is arrived at or until it becomes clear that the requirements cannot be satisfied at all with simple prisms. For high values of the magnification range (e.g. above about 3.5 times) it may become necessary to increase the number of prisms so that the range for each prism pair is more restricted.

It is evident from the parabola-like shapes of the D and $\Delta$ curves in Fig. 16 that it is possible to combine pairs of prisms in inverted relation to each other so as to annul either the deviation or the dispersion of light rays traversing the combination. Thus, if we wish to annul the deviation of a prism in the orientation corresponding to any value of $I_1$ (say at RR') to the left of PP', we can always find a value of $I'_4$ for a second but inverted prism, to the right of PP' that will give equal (but opposite) deviation. Let RR' correspond to the desired value of $I_1$ and let this line cut the D curve at (r), draw a horizontal line through (r) to cut the D curve to the right of PP' at say (s). The vertical SS' through (s) then gives on the abscissa scale the value of $I'_4$ in an inverted prism for which D is equal and opposite. This means, of course, that a position has been found for the inverted prism such that an emergent ray, in a direction from right-to-left, would be parallel with a ray emerging from the first prism in a direction from left-to-right. Thus, the ray from the left if continued in the same direction so as to traverse the inverted prism from left-to-right would finally emerge without deviation from its original direction of entry. Any number of such prism combinations can be found in like manner within the desired range of orientations and this means that two such identical prisms can be moved continuously in proper angular relationship with each other and the optic axis, so as to give a variable magnification system without at any stage imparting a final deviation to the axial rays traversing the system.

The prism magnification yielded by these various combinations in orientation can be read off the $M_d$ and $1/M_d$ curves; thus the magnification of the first prism in the orientation at RR' is given by the ordinate of the $M_d$ curve above the XX' line, and that of the inverted prism in the SS' orientation by the ordinate of the $1/M_d$ curve below the XX' line, and in both cases it is magnification M that is being measured since for the second prism the magnification curves should be inverted owning to the hypothetical reversal of light direction. Thus, the combined magnification for the prism pair is:

$$M\ (\text{at RR}')\times M\ (\text{at SS}')$$

and the total magnification range between the magnification in this orientation and that when the inverted prism is rotated to RR' and the upright one to SS', which gives a minification of $$\left(\frac{1}{M}\right)\text{ at RR}'\times\left(\frac{1}{M}\right)\text{ at SS}'$$

$$[M\ (\text{at RR}')\times M\ (\text{at SS}')]^2$$

It might be pointed out that besides the SS' position of an inverted prism to annul the deviation of an upright prism at RR', we could use an inverted prism in an orientation where $I'_4$ is also at RR' so that the combination would give zero deviation; however, in that case there would be no resultant magnification at all since $$M\ (\text{at RR}')\times 1/M\ (\text{at RR}')=1$$

It is evident that in this particular combination the two prisms amount optically to a plano-parallel plate. This ordinarily corresponds to the midpoint of a zooming range.

The chromatic difference in magnification can also be read off the curves for each of the prism orientations. Thus for the prism at RR' the ordinate of the $\Delta M$ curve above the XX' line gives the chromatic difference in magnification contributed by the upright prism and the ordinate of the $1/\Delta M$ curve below the XX' line gives the contribution of the inverted prism. It will be remembered that this curve is also inverted for reverse passage of the rays in the same way as the M curve. The total chromatic difference in magnification for the combination, both acting in the same direction is:

$$\Delta M\ (\text{for RR}')\times\Delta M\ (\text{for SS}')$$

This quantity, minus one, gives a measure of the seriousness of the aberration; it is always zero on the optic axis and increases proportionately as the distance of a point from the optic axis increases. Thus at distance d from the center of the picture area, the value of $$[\Delta M\ (\text{at RR}')\times\Delta M\ (\text{at SS}')-1]\times d$$

is a direct measure of the length of the tiny line spectrum into which a white point source of light is drawn out from the C to the F rays of the spectrum. If the maximum value of this at the extreme orientations of the prisms exceeds the allowable tolerance, then the system is not acceptable and another kind of glass must be chosen and/or a different prism apex angle. Furthermore, the importance of this aberration in practice depends also upon the magnitude of the unilateral chromatic aberration (see next paragraph) since the effects are additive in some parts of the field. It is found that for small magnification ranges ample correction is possible, but for higher magnification ranges combined with critical definition all over the picture area simple prisms are not acceptable.

In practice it is generally of far greater importance to consider the unilateral chromatic aberration that results when a zero deviation system is designed with simple prisms. Thus, in Fig. 16, let the line RR′ cut the Δ curve at $\rho$ and let the SS′ line cut the Δ curve at $\delta$; then the difference of the ordinates $(\rho-\delta)$ gives a rough measure of the residual angular color. (The exact amount of this aberration can be determined by ray tracing through the whole system.) In general for most practical purposes this error is far from falling within the acceptable tolerances. Furthermore, in some parts of the image field the unilateral color error adds to the chromatic difference in magnification error and the fact that in other parts of the field the errors are subtractive is not much consolation. To get the best results in the unilateral color error, the opposing effects of increasing or decreasing the apex angle and decreasing or increasing $I_1$ must be considered together and the best compromise adopted. Of course, the most effective way of dealing with this aberration is to change the prism material for one of higher V value if possible and that is why in my first example I suggested using fluorite instead of glass as this material has about the lowest relative dispersion (highest V value) of any available. At the same the choice of a material of high V value reduces the chromatic difference in magnification so that from all points of view (as in most optical design) a material of low relative dispersion is highly desirable.

In the preceding paragraphs we have shown what happens when we attempt to annul the deviation of a beam of light traversing a prism pair so that at all magnifications during zooming the axial rays emerge parallel with their direction of entry. We shall next consider the effect of eliminating the unilateral chromatic aberration in a simple prism pair over a finite range of magnifications. It is clear from Fig. 16 that all the arguments in connection with the deviation curve D apply (with obvious changes) to the dispersion curve Δ. For each position of the first prism (say RR′) there is always a point of equal height on the other branch of the curve for the inverted prism such that $R\rho=T\tau$, where the dispersions, being of the correct sign, can annul each other. In other words, referring again to Fig. 13, a position for the inverted prism 133 can be found such that a white ray 131 traverses it from right to left and emerges as a fan 135 of colored rays wherein each of these colored rays is parallel with the corresponding colored ray of the fan 134 that emerges from the first prism 132 traversed from left-to-right by an incident white ray 130. Consequently, a white ray 130 entering the first prism 132 from left-to-right, would upon continuation in the same direction through the second (inverted) prism 133, emerge as a parallel bundle of closely adjacent rays if not as a reunited white ray at a final angle of refraction $I'_4$. In like manner any number of pairs of prisms giving zero unilateral chromatic aberration can be obtained from the curves. But when this is done, the lack of symmetry of the curves and their relative displacements leave residual amounts of deviation. This is obvious from the curves in Fig. 16; the ordinates of the deviation curve D at the positions R and T show a difference of about 4°, while the unilateral chromatic aberrations for the same positions were chosen as identical to eliminate unilateral color in the system. In determining the relative positions of the prisms it must be remembered that $I'_4$ is not (as a general rule) the same as the position angle $\phi_4$. However, $\phi_4$ is easily calculated from the angles obtained in the ray tracing so that it is a simple matter to find all the orientations of the two prisms required to eliminate the unilateral chromatic aberration over a desired magnification range. The chromatic difference in magnification for the various orientations are obtained from the [$\phi$M] $\Delta M$ curves in a manner strictly similar to that explained above in relation to the M curves.

PRACTICAL EXAMPLES OF ZOOM SYSTEMS

By way of example, Table I gives the data for a zoom lens attachment having a magnification range of just over 2 times. Like the system of Fig. 5, this consists of a pair of simple identical prisms in reversed orientation in regard to each other and acting in one plane containing the optic axis, together with a second identical pair in identical mutual orientation acting in a second plane at right angles to the first about the optic axis. In Table I only the data pertaining to one prism pair is given since that is sufficient to define the whole system. The characteristic curves which form the basis for this design are the particular ones that we have been discussing in the preceding paragraphs and in Fig. 16.

Table 1

[Material of prism; $N_C$=1.69313; $N_D$=1.69680; $N_F$=1.70554; V=56.2. Apex angle of each prism: 26°.]

| | | | | | | | |
|---|---|---|---|---|---|---|---|
| $\phi_1$ | 20° | 25° | 30° | 35° | 40° | 45° | 50° |
| $\phi_3$ | 20°19′46″ | 16°34′56″ | 12°47′45″ | 9°00′00″ | 5°12′15″ | 1°25′04″ | −2°19′46″ |

It will be observed, from the values of $\phi_1$ and $\phi_3$ shown in the table, that the prisms are rotated in opposite directions but by angular amounts which are unequal and nonlinear. This is not an insurmountable disadvantage in practice, since cam action can easily be made accurate tice by making the angular movements of the two prisms in a pair (as well as of those in the plane at right angles). However, only very small errors are introduced in practice by making the angular movements of the two prisms in a pair in strict linear relationship over the 2:1 magnification range here envisaged, and in that case simple gear wheels can be used to link the prism rotations.

Since in this design the emergent rays have been allowed to deviate from the direction of entry in order to be free to correct the unilateral chromatic aberration, there is a progressive movement or wandering of the whole picture across the picture frame in a 45° direction during a zoom, this being the resultant of the two equal deviations caused by the two prism pairs located in planes at right angles to each other about the optic axis. This deviation varies between zero and plus or minus 5 or 6 degrees in the 45° plane. On the other hand, the unilateral color is almost perfectly corrected at all magnifications (within the 2:1 range) and never amounts to more than about 6 seconds of arc. The maximum chromatic difference in magnification amounts to about .001 inch in the corner of a 16 mm. film frame. There is no appreciable distortion and there are no other optical errors. An auxiliary device for compensating for this wandering of the image is described in my copending application Serial No. 498,167, previously mentioned. There are advantages also in mounting the two prism pairs at 45° to the horizontal and counteracting the deviation error by swiveling the camera on a support.

As another example and to illustrate the effect of apex angle and index and the kind of results that might be expected when an attempt is made to strike a compromise between the unilateral chromatic aberration and the deviation, a system with prisms of considerably smaller apex angle and made of a material having a lower mean index and a higher V value, has been selected. With two pairs of prisms the magnification range is about 2.3 times, and the deviation errors vary between plus and minus 2°; the maximum unilateral color aberration reaches nearly 45 seconds of arc, and the chromatic difference in magnification comes to about .0013 inch.

Fig. 17 shows the characteristic curves for one of the prisms of this system, and Table II gives the orientations of a single pair of prisms (the other pair being identical) over the required magnification range. Comparison of this series of curves with those in Fig. 16 shows how the quantities involved depend upon prism angle and material.

Table II

[Material of prism: $N_C=1.52036$; $N_D=1.52300$; $N_F=1.52929$; $V=58.6$. Apex angle of each prism: 18°.]

| | | | | | | | |
|---|---|---|---|---|---|---|---|
| $\phi_1$ | −10° | 0° | 10° | 20° | 30° | 40° | 50° |
| $\phi_2$ | 30° | 20°40′ | 11°20′ | 2° | −7°20′ | −16°40′ | −26° |

In Table II the angular movements of the two prisms of a prism pair have been made linear in regard to each other. Thus for every 10° that the first prism is rotated the second is rotated through 9°20′ in the opposite direction.

It becomes clear from a study of many families of curves, such as those shown in Figs. 16 and 17, plotted for prisms of differing apex angles and made from any of the presently available glasses having different optical properties, that it is generally impossible, over a usefully large range of magnification, to find a simple pair of identical prisms which will yield systems simultaneously free from both deviation and unilateral color. The curves further indicate that the problem involved in designing a prism pair to eliminate both these aberrations might be solved if we could suitably modify the shapes of the characteristic curves. For example, if the Δ curve could be moved bodily towards the left of the diagram so as to make its minimum value occur at about the same angle $I_1$ as that at which the minimum value of the D curve occurs, there would be much less difficulty in obtaining simultaneous correction. A practical example is discussed below which can be regarded as an attempt to accomplished this very object in the simplest way possible. Since no optical material presently available enables the required conditions to be met over a wide magnification range, further improvements in the system have been sought by combining different optical materials in each prism.

According to this form of the invention, each prism is compound, preferably a cemented doublet comprising materials differing in dispersion. Although the triplets and more complex form are not precluded from this invention, attention will be devoted in this description only to the cemented doublet type since it has proved possible with this simplest form to satisfy all of the optical and mechanical requirements that arise in normal practical applications. Of course, cemented prisms as such are not new, and are well-known in achromatic prisms and their opposites—prisms for direct vision spectroscopes. However, in the present case the requirements are quite different: in the spectroscopic application the object is to provide a composite prism of great dispersion and little or no deviation, while ordinary achromatic prisms are designed to give no dispersion at minimum deviation. Now the minimum deviation position is precisely the position in which a prism gives no magnification and is of very little importance in connection with my prismatic systems. According to my invention the object is to provide as little chromatic difference in magnification as possible at high magnifications (or minifications) consistent with the equally important consideration of adjusting the dispersion and deviation curves so as to permit the elimination of both deviation and dispersion from a prism pair over a suitable range of orientations as indicated in the preceding paragraphs.

Although there are many possibilities of combining materials so as to provide a satisfactory prism pair, it greatly simplifies the calculations during design to choose materials having the same (or nearly the same) mean refractive index since, for any chosen apex angle (between outer surfaces), the interface may be shifted for changing the Δ curves and the chromatic difference in magnification without materially changing the D curve. However, the main advantage arises in connection with the manufacture of the prisms for, with such a combination of glasses, the angular position of the cemented interface need not be located with any very great degree of precision, although of course, the angle between the outer surfaces must still be made to the usual close tolerances. Calculation has shown that quite large errors (amounting to six, or even more, minutes of arc) may be permitted in the angular location of the interface without introducing any appreciable color errors or causing double images. Of course, this choice of materials having substantially the same mean refractive index for the two parts of a cemented doublet limits somewhat the number of materials available, but nevertheless there is still ample scope to obtain the desired degree of optical perfection.

Fig. 18 shows the curves for the deviation D and the unilateral color Δ of a cemented doublet prism consisting of a 27° prism of Dense Barium Crown glass, [$N_D=1.6170$,] $N_D=1.6173$, $V=55.0$ and a −12° prism of Dense Flint glass, $N_D=1.6170$, $V=36.6$, making a total angle of 15°. It may be seen that these curves are flatter than those in Figs. 16 and 17 and, of more importance, the two minima almost coincide. The magnification M (not shown) is about the same as in Fig. 17, and the chromatic difference in magnification ΔM (not shown) is very small.

Figs. 19 to 22 show the optical parts of a zoom system made up of four such cemented doublet prisms. Figs. 19 and 20 show plan and elevation of the system with the prisms in the position of extreme minification and Figs. 21 and 22 show plan and elevation with the prisms in the position of extreme magnification. The [object] *objective* 57 is shown schematically in outline, and the position of the entrance pupil thereof is indicated by the two short line segments 200. The apertures and locations of the prisms have been carefully computed to give as compact a design as possible while still covering the desired relative aperture and field. To this end, the full relative aperture is maintained only in the central areas of the picture and the light is allowed to fall off to 50% of this value at the extreme picture edges. In other words, the vignetting at the edges amounts to a loss of one "stop-number" which is not excessive in most photography, but it means that a lens should be selected or designed so that there is no further vignetting in the camera itself. Also, since the angle of view in the vertical plane is smaller than in the horizontal plane, the system as shown is more compact than if turned 90°.

The system has been designed to include a 40 mm. f/1.6 cine camera lens and to vary continuously between 23 mm. and 69 mm. focal length. The extreme right and left hand rays 195, 196 in Fig. 19 appear to spread wider than the prism before emerging from it, but actually they lie in the plane of ray 205 (Fig. 20) and emerge from the prism at points 197 and 198.

The arrangement of the prisms is similar to that of the system of Fig. 5. Two prisms 191, 192 magnify and minify in the vertical plane and two others, 193, 194, are at 90° to these and operate in the horizontal plane. The prisms are pivoted on axes 201, 202, 203 and 204 parallel to their respective refracting edges. The glasses in each prism pair have the following sequence: crown-flint-flint-crown. The angles $\phi_1$ and $\phi_4$ for the prisms in each pair are given in Table III. Of course, the relative positions of the two prisms in the second pair are identical with those in the first pair and synchronism between all the prisms is to be maintained at all magnifications. Greater precision than about one twentieth of a degree is not necessary, and the angles are given to that degree of accuracy in the table.

Table III

| $\phi_1°$ | $\phi_4°$ |
|---|---|
| −22 | 35.3 |
| −19 | 31.3 |
| −16 | 27.6 |
| −13 | 24.05 |
| −10 | 20.6 |
| −7 | 17.25 |
| −4 | 14 |
| −1 | 11 |
| 2 | 8 |
| 5 | 5 |
| 8 | 2 |
| 11 | −1 |
| 14 | −4 |
| 17 | −7 |
| 20 | −10 |
| 23 | −13 |
| 26 | −16 |
| 29 | −19 |
| 32 | −21.8 |
| 35 | −24.5 |
| 38 | −27.1 |
| 41 | −29.6 |
| 44 | −32.05 |
| 47 | −34.45 |
| 50 | −36.8 |

When the figures from Table III are examined, we see that the relationship between $\phi_1$ and $\phi_4$ is so nearly linear that we can make it exactly linear, moving each prism by equal amounts in opposite directions. The best compromise leads to the following results:

When $\phi_1=50.5°$, $\phi_4$ is set at $-37.2°$

When $\phi_1=-22.2°$, $\phi_4=35.5°$

Final checking of the errors that might have been introduced by the slight alterations involved proves that no serious errors have arisen; on the other hand, a considerable advantage is gained in the simplicity of the mechanical arrangements, and the two prisms of a pair are connected together by two commercially available gear wheels each having the same number of teeth.

In the case where the relative movements of the prisms are unequal though still linear (e.g. as in Table II), the only modification necessary lies in a proper choice of the number of teeth in each of the gear wheels. This is not difficult since less than a complete circumference of each gear wheel needs teeth and thus pitches such that the number of teeth in the whole circumference would not be an integer are permissible. Of course, any non-linear relative movements between the two prisms of a pair can be achieved by cams or other well-known mechanical devices.

Calculations show that the unilateral chromatic aberration is never greater than 20 seconds of art throughout the range of magnifications in the two unit system. Further, during a zoom the direction of the emergent axial rays remains parallel with that of the entering rays within a few minutes of arc. The chromatic difference in magnification lies within the accepted tolerances for all applications of 16 mm. cinematography when the magnification range does not exceed about three times. The distortion of the system has not been investigated in detail, but there is every reason to believe that this will cause no trouble since other similar systems that have been constructed have proven singularly free from this defect. With plane wave fronts (i.e. in collimated light) for which these systems are designed, there are no other optical aberrations to consider; that is one of the fundamental advantages of this invention over all previous "zoom" or "Pancratic" systems.

The pivot axes 201, 202, 203, and 204 have been chosen so as to give as short a system as possible in the extreme positions. A careful study shows that the prisms can be rotated farther in the direction of minification without mechanical interference than in the direction of magnification, so that the range is somewhat unsymmetrical in some embodiments of the invention, running from M to a little beyond 1/M.

Figs. 23 and 24 show the same system including mechanical parts. Each prism is supported by two co-linear shafts e.g. 230, 230′ fitted with collars as shown, for gripping the prisms or optionally attaching to a yoke which holds the prism. The shafts rotate in bearings (not shown) and carry helical gears 231, 232, 233, 234 at one end so that the two gears of a prism pair intermesh. The two sets of prism pairs are moved in unison by means of a helical, or multiple thread, worm gear formed upon a rotatable and slidable shaft 240. The worm may be continuous or in two parts 241, 242 as shown in these figures. Both sections of the worm gear slope in the same direction and in this case the thread is shown as right handed so as to mesh correctly with the helical gears 231 and 233. The worm shaft 240 can slide and rotate in the bearings 243 and another bearing not shown. Within the bearing 243 is a ball and spring detent engaging one of two or more half round grooves 244 turned in the shaft 240. In order to rapidly change the focal length from 23 to 69 mm. all that is needed is to pull upon the knob 245 until the detent clicks into the second groove. For gradual changes in focal length the knob 245 is rotated in the appropriate direction while the ball is in one of the grooves on the shaft. Suitable stops, not shown, are provided so that the prisms cannot be rotated beyond their limiting positions. An indicator needle such as shown in Fig. 25 (251) is provided on one of the prism shafts to indicate the focal length at any setting. The focusing lenses 91, 92, operate as described with reference to Fig. 9.

Figs. 25 to 29 show a modification of the mechanical operating means in which a shaft of rectangular cross section is used instead of the worm gear 241, 242, a rack being provided on the two operative sides of the rod. The prisms are rotated by sliding the rod longitudinally, but the fine adjustment by rotating the knob 245 (Figs. 23, 24) is not available in this form.

Fig. 25 is a plan view of this form of the invention. The optics are or may be the same as in Figs. 19–24. The focusing ring 95 is provided with a distance scale in a conventional manner. A pointer 251 is attached to the end of one of the prism axes to indicate the focal length of the system at all times. The whole prism system is enclosed in a box of substantially square cross section, and a crank 252 is provided for the zooming operation.

Fig. 26 is the same view but with the top cover removed and Fig. 27 a side view with the side cover removed. The prisms 191, 192, 193, 194 are mounted between pairs of end plates 261, 262, 263, 264 which clamp the prisms after the tightening of the screws e.g. 265. The shafts e.g. 230, 230′, upon which the individual prisms rotate are fastened to these end plates and turn in bearings in the walls of the box. Upon the left-hand and bottom ends of the prism axes are gear wheels 266, 267, 268, 269 the two pairs of which mesh. One wheel of each pair meshes with a section of rack cut in or attached to the slide rod 270, wheel 266 meshing with rack 271 on the top of the slide and 268 meshing with rack 272 on the inner side of the slide. At any convenient position along the box an additional shaft 273 is provided to which is pinned a small pinion 274 meshing with an additional length of rack 275 on the slide 270. The hand crank 252 is attached to one end of this shaft for motivating the movement of the slide 270 and hence the zooming. For clarity, the crank is shown in different positions in the two figures, but the other moving parts are unchanged. As shown, both ends of the shaft 273 are non-circular and extend outside the box so that the crank can be attached to either end at the option of the user. Thin black light baffles 277, 278, and 279 (Fig. 27) are provided to prevent stray light from reaching the objective and others may be strategically located as is usual in optical instruments.

Figs. 28 and 29 are front and rear views of the zoom system cut away to show the end of the slide 270 which is shaped to fit between guide ways 280.

Figs. 28 and 29 also show a viewfinder system especially suited for use with a zoom system. A frame 281 supports a transparent window 282 upon which are marked (e.g. by etching and filling with pigment) a series of rectangular frame marks 283 defining the field of view for different focal lengths in the zooming range. This series of frames are marked to correspond to the scale for the zooming pointer 251 (Fig. 25). Referring to Fig. 29, the observer places his eye behind the peep hole 293 in an opaque slide 292 which is slidable up and down in a channel in the support post 291. A distance scale is provided on the post 291, and by setting the slide so that the peep hole is opposite the appropriate point on the scale parallax between finder and camera is eliminated. The two parts of the finder 281, 291 are shown in a folded down position in Fig. 27.

MISCELLANEOUS APPLICATIONS OF THE PRISM-LENS SYSTEMS

In order to avoid repetition the basic form of my invention shown in Fig. 5 as well as the other forms described in this specification with reference to the subsequent diagrams, have been considered almost exclusively in connection with the formation of real (as opposed to virtual) images. This, however, is only one (although perhaps the most important) of the practical applications of my prism-lens systems.

With reverse passage of the light rays through these systems a virtual image is obtained which may appear to an observer as larger or smaller than the original object according to the orientation of the prisms or the focal length of the lens. Thus referring to Fig. 5, upon looking through the system from the lefthand side towards an illuminated object at 58 a virtual image of 58 is seen. In this case with the prisms in the orientation shown, the angular magnifcation is less than that obtainable by the positive lens 57 used alone. Thus accepting the usual value of 10 inches as the nearest point of distinct vision and designating the focal length of the lens 57 as "F" inches, the magnification of the lens 57 alone is 10/F. Let the magnification of the prismatic system in the orientation shown be "m" (actually a minification) then the combination has a magnification of $m \times 10/F$. With the prismatic system reversed end-for-end the magnification is $M \times 10/F$. where $M=1/m$. We thus have a reading glass of three optional powers $m \times 10/F$., 10/F. and $M \times 10/F$. It should be noted that since the object 58 is at the focus of the lens 57, collimated light traverses the prisms and this, as has been explained previously, is a necessary condition for the elimination of most of the optical aberrations. It follows also that no focusing lenses (such as 91, 92 in Fig. 9) are required at the eye-end although some observers may find it convenient to retain them. The device shown in Fig. 6 is therefore not only a camera objective, or projector objective of various focal lengths, but also a magnifying glass of various magnifications. The modification shown in Figs. 10 and 11 is suitable where greater ranges of magnification are required and the zoom or pancratic systems shown in Figs. 19 to 27 provide reading glasses (or microscopes) of continuously variable power.

As a low power reading glass my prism-lens systems have several advantages over conventional systems. In the first place for a given magnification the working distance can be much greater than with the lenses above, and in the second place the ease with which a variable magnification can be obtained without re-focusing is a great convenience. For binocular reading glasses there is the further advantage that the whole system can be made large enough at the eye-end to encompass both eyes while still retaining useful magnification. This is something that cannot be done with conventional lens systems where the magnification depends upon the actual dimensions of the lenses (i.e. focal lengths) and therefore a separate short focal length system is required for each eye; the magnification of the prism part of my invention on the other hand is independent of the physical size and can be made as large as other considerations will allow.

As a high power reading glass, or microscope, my invention also has advantages not present with conventional systems. Here, the main advantage (apart from the possibilities of variable magnification and greater working distant) lies in the fact that the prismatic systems are singularly free from most of the troublesome aberrations with which conventional systems are afflicted. Thus the combined prism-lens system can be designed to so divide the contributions of each system to the total magnification, that for any given magnification a better performance can be obtained or, conversely for a given quality of image a greater magnification is obtainable.

At the beginning of this specification a brief reference was made to the application of my invention to telscopes and other afocal systems having at least one positive lens. In most of the diagrams, namely Figs. 5 to 11 and 19 to 27, a positive lens 57 has been shown diagrammatically (in conjunction with the prisms) as a final image forming means. The diagrams are thus directly illustrative of camera objective systems or, with reverse passage of the light rays, they represent projection systems. Thus the diagrammatically shown lens 57 represent any photographic or projection objective.

In applying my invention to telescopes and other afocal systems the lens 57 is a telscope-type objective and then the other lenses (and/or reflecting prisms) usual in the various types of such instruments would be added. Thus in the case of a Galilean telescope a negative eyepiece would be used and for astronomical telescopes a Ramsden, Huygenian or similar ocular would be employed. It is to be emphasized that the prisms are not necessarily positioned in front of the objective but may be located in any airspace in the system in which the light is collimated. For example in some types of terrestial telescopes employing erecting lenses in the ocular, there is space between the erecting lenses where the light is collimated. This is a convenient location for inserting the prismatic systems to produce a pancratic telescope of convenient size. Thus referring to Figs. 23 and 24 by way of example, we may replace the lenses 91 and 92 by one of the aforesaid erecting lenses of the eyepiece and let the lens 57 represent the other, so that by manipulating the knob 245 a telescope of variable power is obtained. It should be noted that with this, as well as with all the other variable "power" applications of the prism-lens systems, variable magnification is obtained without the necessity of refocusing at each setting.

I claim:

1. An optical system of changeable focal length comprising an image-forming lens system focused on a distant object field in front thereof and two anamorphotic prismatic systems in front thereof and optically axially aligned with each other and with the lens system, in which each prismatic system comprises two refracting prism components arranged with their refracting edges perpendicular to and on opposite sides of the optical axis and parallel to each other and with their faces tilted to a position at which the angle of incidence of the optical axis on the front face of each prism component ranges from zero to negative, where positive and negative angles of incidence are defined as those which are in the same sense and in the opposite sense respectively as that of a ray traversing the prism component at minimum deviation, in which each prismatic system is adapted to magnify the distant object field in its active plane defined as the axial plane perpendicular to the refracting edges of the prism components, in which the active plane of one prismatic system is perpendicular to that of the other prismatic system and the respective magnifications of the two prismatic systems in their respective active planes are mutually equal, whereby the two prismatic systems cooperate to magnify the distant object field equally in all directions, and in combination therewith means for supporting the two prismatic systems and the lens in operative alignment and means for changing the prism components into a position in which the two components of each prismatic system are again arranged with their refracting edges perpendicular to and on opposite sides of the optical axis and parallel to each other, in which the prism components are tilted to a position at which the angle of incidence of the axis on the front face of each prism component is greater than twice the angle of incidence of a minimum-deviation ray and in which the respective magnifications of the two prismatic systems in their mutually perpendicular active planes are again mutually equal and are each substantially equal to the reciprocal of the magnification in said first named position, a refracting edge of a prism component being defined as the geometrical line of intersection of the planes defined by the two faces thereof which are traversed by the light rays.

2. An optical system according to claim 1 in which the prism components are individually pivoted on axes parallel to their respective refracting edges and operatively connected together for rotation in unison at a predetermined ratio of angular speeds for changing the magnification of said prismatic systems continuously from a value M greater than unity to a value substantially equal to 1/M and thereby changing the focal length of the optical system from MF to F/M where F is the focal length of the lens system, the geometrical axes of rotation passing through the bodies of the respective prisms closer to the bases thereof than to the apices.

3. An optical system according to claim 2 in which each prismatic system consists of two prism components each of which consists of two prism elements cemented together, the refracting edges of the two elements being parallel to the refracting edge of the component and on opposite sides of the optical axis, and in which the two elements of each prism component are made of optical materials of mutually different dispersive indices so chosen that each component is slightly undercorrected for color.

4. An optical system according to claim 3 in which at least a sector of a gear wheel is mounted on the axis of each prism component, in which the gears associated with the two prism components of each prismatic system intermesh and have a predetermined gear ratio for rotating said prism components in unison, in which rack means is provided which extends in a direction substantially parallel to the optical axis and which is provided with teeth adapted to mesh with the gear associated with one of the prism components of one prismatic system along one side of said rack means and to mesh with the gear associated with the corresponding prismatic component of the other prismatic system along a side of said rack means substantially 90° from said first-named side, and in which means are provided for moving said rack means for rotating all said prismatic components in unison.

5. An optical system according to claim 1 in which the prism components are individually pivoted on axes parallel to their respective refracting edges, the geometrical axis passing through the body of the prism closer to the base than to the apex, and in which at least a sector of a gear wheel is mounted on the axis of each prism component, in which the gears associated with the two prism components of each prismatic system intermesh and have a predetermined gear ratio for rotating said prism components in unison for changing the magnification of said prismatic systems continuously from a value M to a value substantially equal to 1/M, and in which rack means is provided which extends in a direction substantially parallel to the optical axis and which is provided with teeth adapted to mesh with the gear associated with one of the prism components of one prismatic system along one side of said rack means and to mesh with the gear associated with the corresponding prismatic component of the other prismatic system along a side of said rack means substantially 90° from said first-named side, and in which means are provided for moving said rack means for rotating all said prismatic components in unison.

6. An optical system according to claim 1 in which the prism components are fixedly mounted in a tube having two ends and in which said last-named means comprises means for selectively attaching said ends to the front of said lens system.

7. In combination an objective lens, two prismatic magnification systems each fixedly mounted in a tube having two ends, means for selectively attaching said ends to the front of said objective and for holding the selected system in optical alignment therewith, and means for selectively attaching the ends of one system to the ends of the other system and for holding the systems in optical alignment with each other, characterized by the magnification provided by one system being M when one of its ends is attached to said objective and 1/M when its other end is so attached and by the magnification provided by the other system being $M^3$ when one of its ends is attached to said objective and $1/M^3$ when its other end is so attached, whereby the several combinations provide eight different focal lengths which with the original objective used alone make up a series of nine different focal lengths in geometrical progression.

*8. An anamorphotic optical system, comprising two members, each consisting of two refracting prism components having their generators parallel to one another wherein in an operative plane at right angles to such generators one component will deviate an incident ray in one sense and the other component will deviate such ray in the opposite sense, the prism generators in one member being arranged at right angles to those of the other member, the first member having its axial direction (that is the direction of an axial incident ray which emerges from the member substantially parallel to its direction of incidence) substantially parallel to the axial direction of the second member, and a collimating lens having spherical surfaces located in front of the two members.*

*9. An anamorphotic optical system as claimed in claim 8 in which the collimating lens comprises a plurality of components, and means for relatively adjusting such components to vary the equivalent focal length of the collimating lens.*

*10. The combination with the anamorphotic optical system claimed in claim 9, of a main objective located behind such system.*

*11. The combination with the anamorphotic optical system claimed in claim 8, of a main objective located behind such system.*

*12. An optical system for producing an undistorted variable image enlargement or reduction, comprising two axially stationary pairs of prisms, aligned along an optical axis and spaced from each other, the prisms of each pair being symmetrically arranged with respect to a plane*

*of symmetry at right angles to the optical axis and being permanently held relatively to each other in a position in which the plane of angular distortion in the two prisms is the same, and the two pairs being permanently held in a position relatively to each other in which the plane of angular distortion of the two pairs is at right angles to each other, means to adjust the inclination of the optically active surfaces of the two prisms of each pair toward the optical axis and towards each other, and means to produce the same relative adjustment of the optically active surfaces relatively to the optical axis in both pairs of prisms, by imparting an angular movement of the same extent to all the subunits of the system.*

References Cited in the file of this patent or the original patent

UNITED STATES PATENTS

| | | |
|---|---|---|
| 818,553 | Phillips | Apr. 24, 1906 |
| 1,647,631 | Ives | Nov. 1, 1927 |
| 1,758,801 | Moses | May 13, 1930 |
| 1,898,787 | Newcomer | Feb. 21, 1933 |
| 1,905,442 | Coors | Apr. 25, 1933 |
| 1,931,992 | Newcomer | Oct. 24, 1933 |
| 1,932,082 | Newcomer | Oct. 24, 1933 |
| 2,023,217 | Benford | Dec. 3, 1935 |
| 2,048,284 | Newcomer | July 21, 1936 |
| 2,375,634 | Dunning | May 8, 1945 |

FOREIGN PATENTS

| | | |
|---|---|---|
| 8,512 | Great Britain | of 1898 |
| 338,962 | Great Britain | Dec. 1, 1930 |

OTHER REFERENCES

Gromont: Article in Revue d'Optic, volume 9, 1930, pages 164–167.